United States Patent
Han

(10) Patent No.: US 9,740,983 B2
(45) Date of Patent: *Aug. 22, 2017

(54) NONDETERMINISTIC TURING MACHINE COMPUTER ARCHITECTURE FOR EFFICIENT PROCESSING USING SPATIAL RELATIONSHIPS

(71) Applicant: Sherwin Han, Portsmouth, RI (US)

(72) Inventor: Sherwin Han, Portsmouth, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/278,856

(22) Filed: Sep. 28, 2016

(65) Prior Publication Data
US 2017/0017888 A1    Jan. 19, 2017

Related U.S. Application Data

(63) Continuation-in-part of application No. 14/191,384, filed on Feb. 26, 2014, now abandoned, which is a continuation-in-part of application No. 13/190,646, filed on Jul. 26, 2011, now abandoned.

(60) Provisional application No. 61/769,544, filed on Feb. 26, 2013.

(51) Int. Cl.
*G06N 5/04* (2006.01)
*G06F 7/38* (2006.01)
*G06F 17/10* (2006.01)

(52) U.S. Cl.
CPC ............... *G06N 5/04* (2013.01); *G06F 7/38* (2013.01); *G06F 17/10* (2013.01)

(58) Field of Classification Search
CPC .................................. G06N 5/04; G06N 5/02
USPC ............................................................ 706/46
See application file for complete search history.

(56) References Cited

U.S. PATENT DOCUMENTS

| 6,611,841 B1 | 8/2003 | Han | |
|---|---|---|---|
| 9,342,788 B2 | 5/2016 | Han | |
| 2002/0087567 A1* | 7/2002 | Spiegler | G06F 17/30324 |
| 2004/0039737 A1* | 2/2004 | Han | G06N 5/022 |
| 2013/0179378 A1* | 7/2013 | Han | G06N 5/02 |
| | | | 706/46 |

OTHER PUBLICATIONS

Han S., "Hierarchical Dual Memory Structure Determines Cognitive Logic of the Human Brain", Proc. 7th IEEE Int. Conf. on Cognitive Informatics (ICCI'08), 2008.*
Wen H., "Knowledge Recognition Algorithm enables P = NP", 2010.*

* cited by examiner

*Primary Examiner* — Dave Misir
(74) *Attorney, Agent, or Firm* — Blueshift IP, LLC; Robert Plotkin

(57) ABSTRACT

A nondeterministic Turing machine (NTM) performs computations, such as factorization and arithmetic, using a spatial binary enumeration system, a three-dimensional relation system, a simulated-human logic system, and a bijective-set memory system. The NTM may be constructed by a deterministic Turing machine (DTM) using the four systems listed above.

19 Claims, 36 Drawing Sheets

| DECIMAL | ... | -9 | -8 | -7 | -6 | -5 | -4 | -3 | -2 | -1 |
|---|---|---|---|---|---|---|---|---|---|---|
| SPATIAL | ... | -1+1+1-1 | -1+1+1+1 | -1-1-1 | -1-1+1 | -1+1-1 | -1+1+1 | -1-1 | -1+1 | -1 |

| 0 | 1 | 2 | 3 | 4 | 5 | 6 | 7 | 8 | 9 | ... |
|---|---|---|---|---|---|---|---|---|---|---|
| 0 | +1 | +1-1 | +1+1 | +1-1-1 | +1-1+1 | +1-1-1 | +1+1+1 | +1-1-1-1 | +1-1-1-1 | ... |

FIG. 2

EIGHT BASIC TRIPLETS (1)

-1z -1y -1x

-1z -1y +1x

-1z +1y -1x

-1z +1y +1x

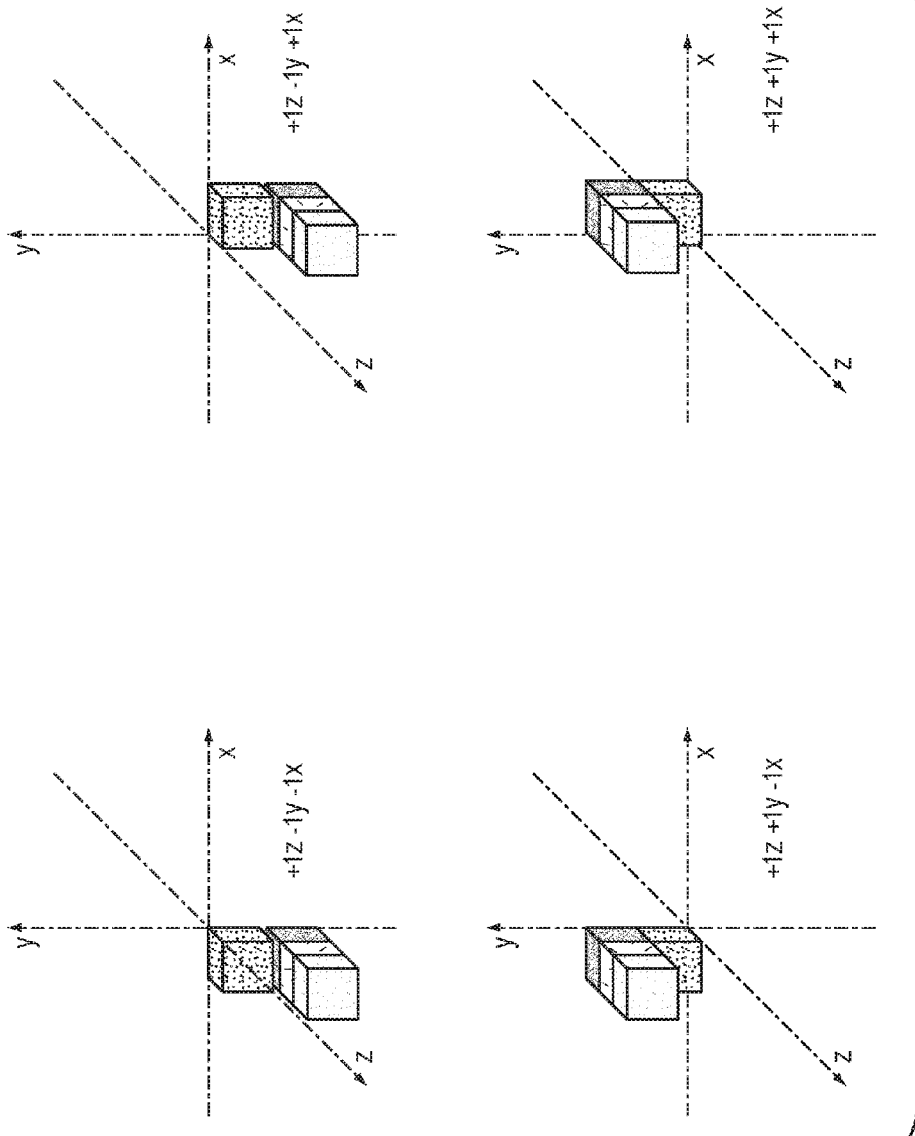

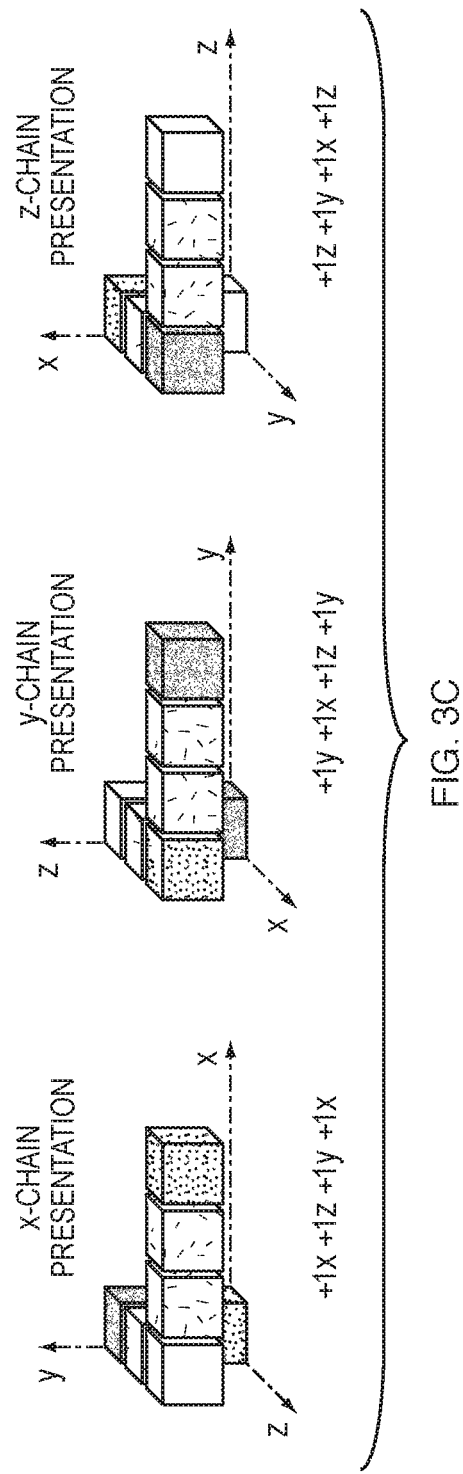

4z 3y 2x 1z 4y 3x 2z 1y 4x 3z 2y 1x $1z\,1y\,\text{-}1x\,\text{-}1z\,\text{-}1y\,1x = 49$

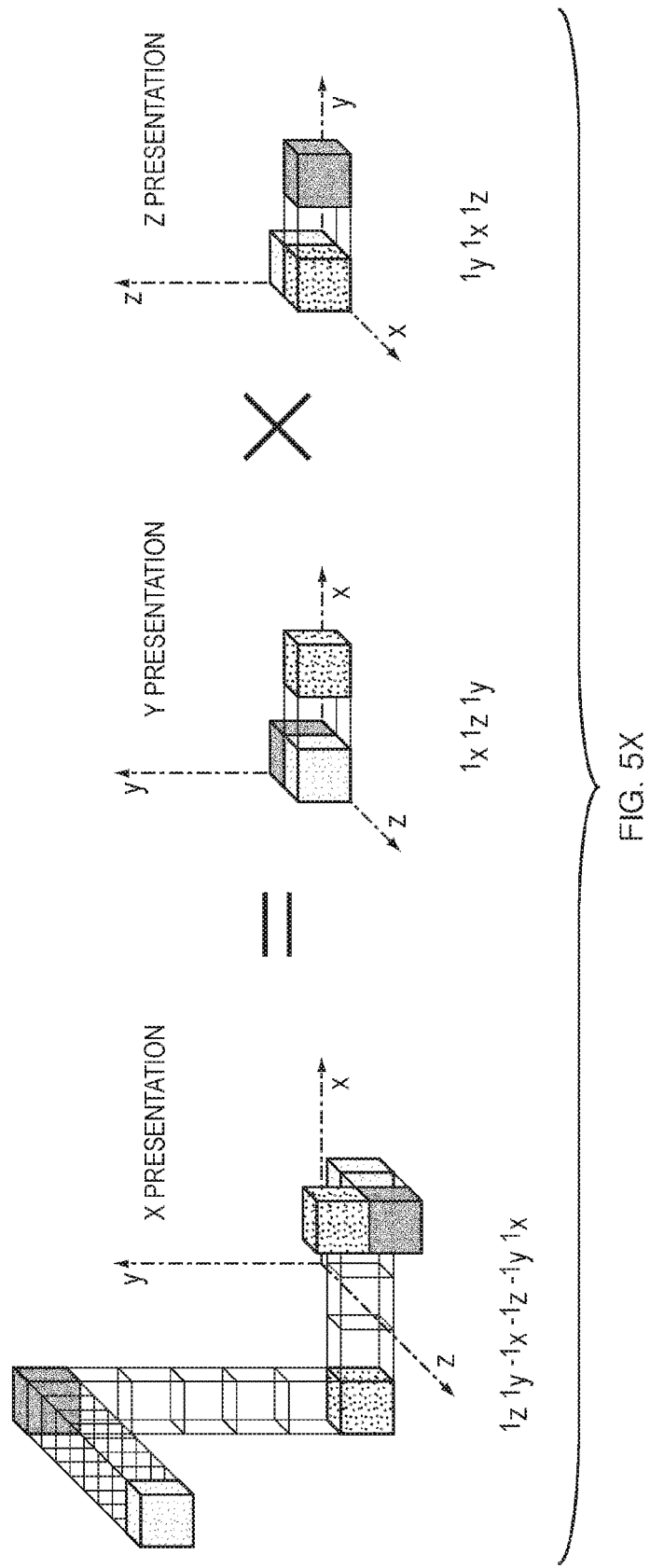

FIG. 6A

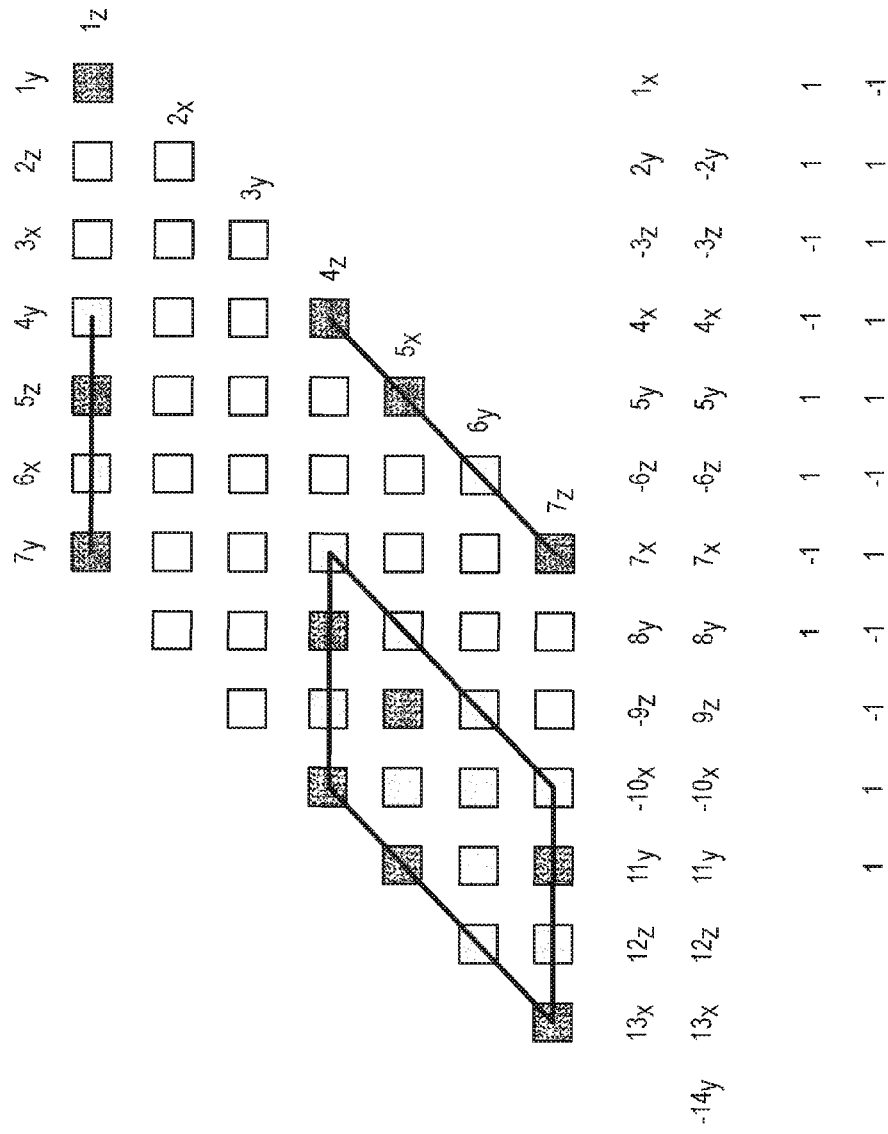

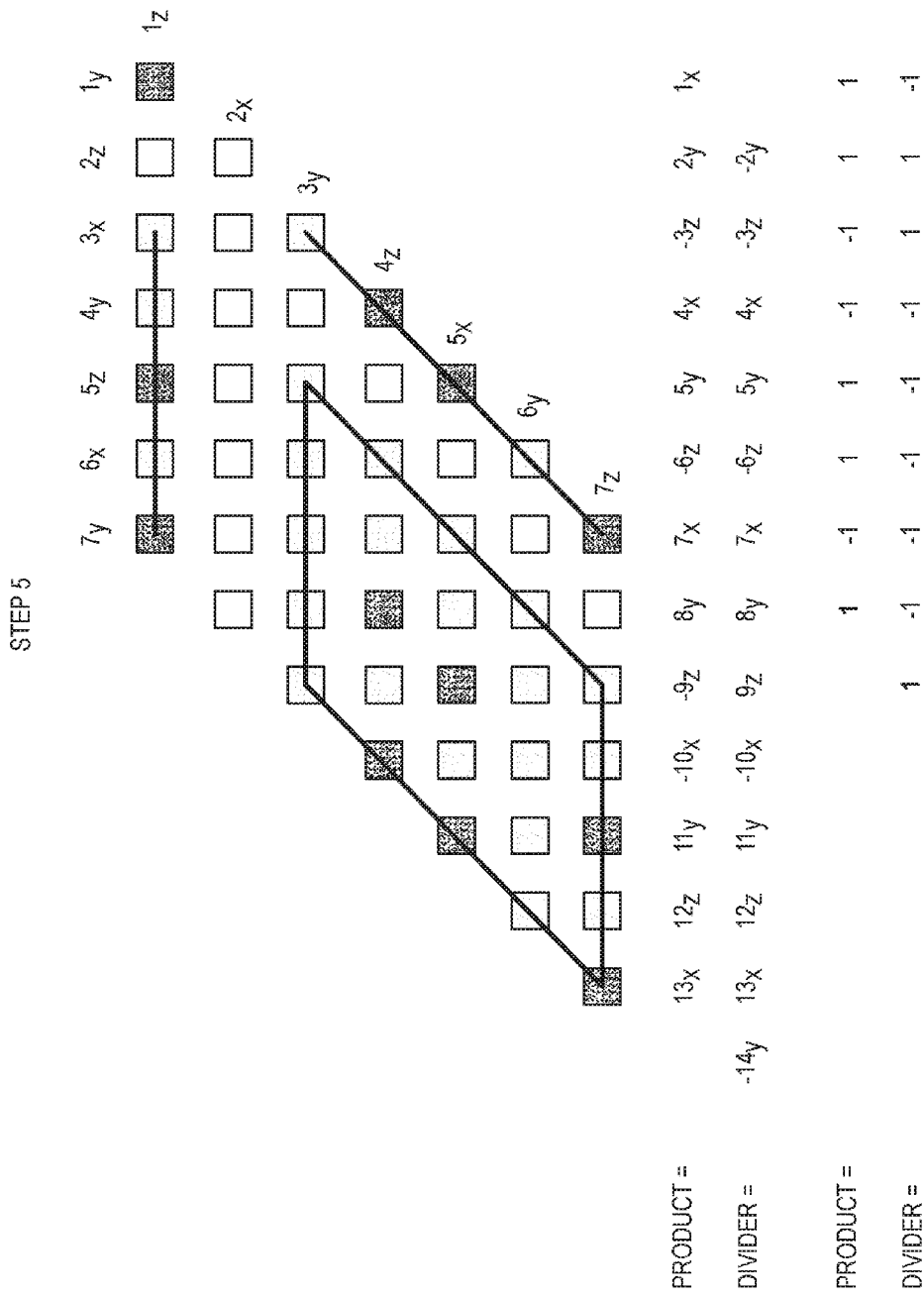

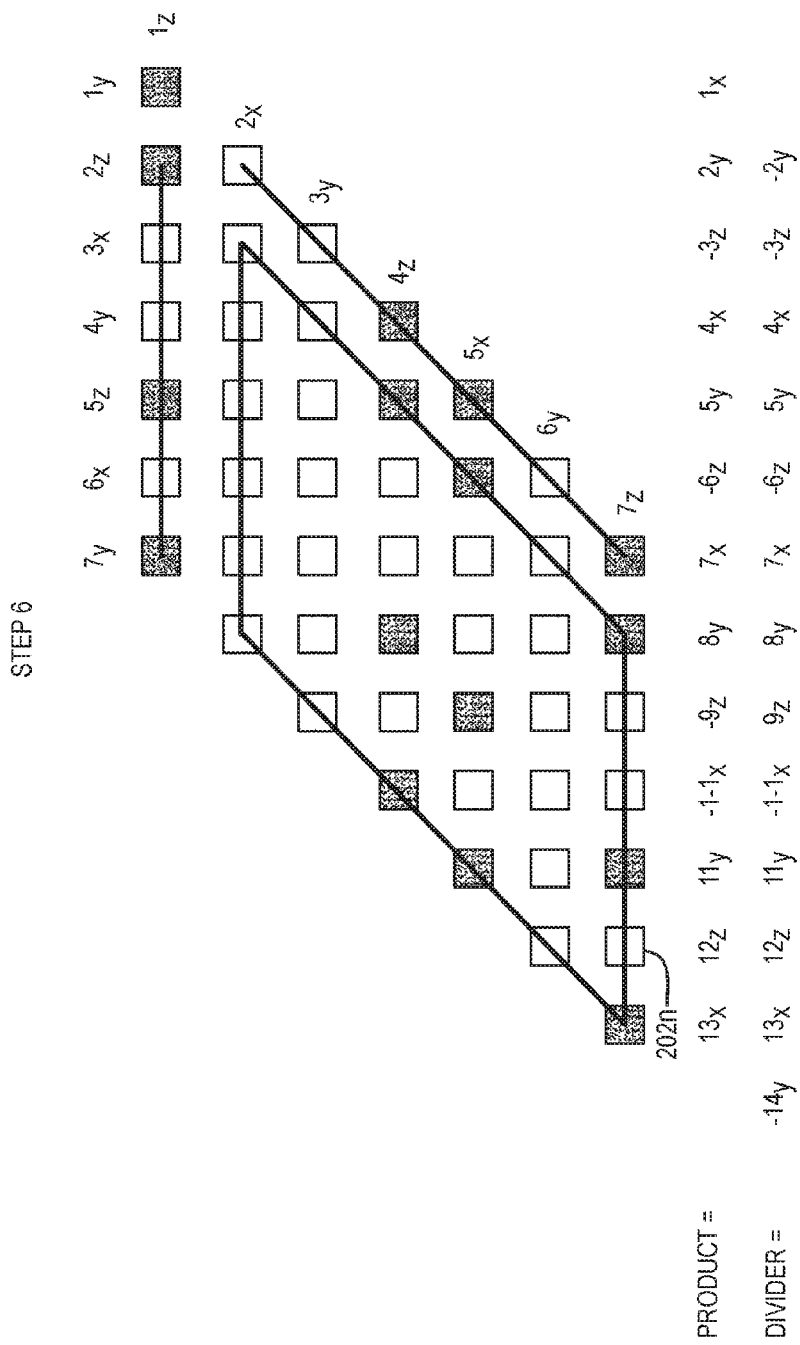

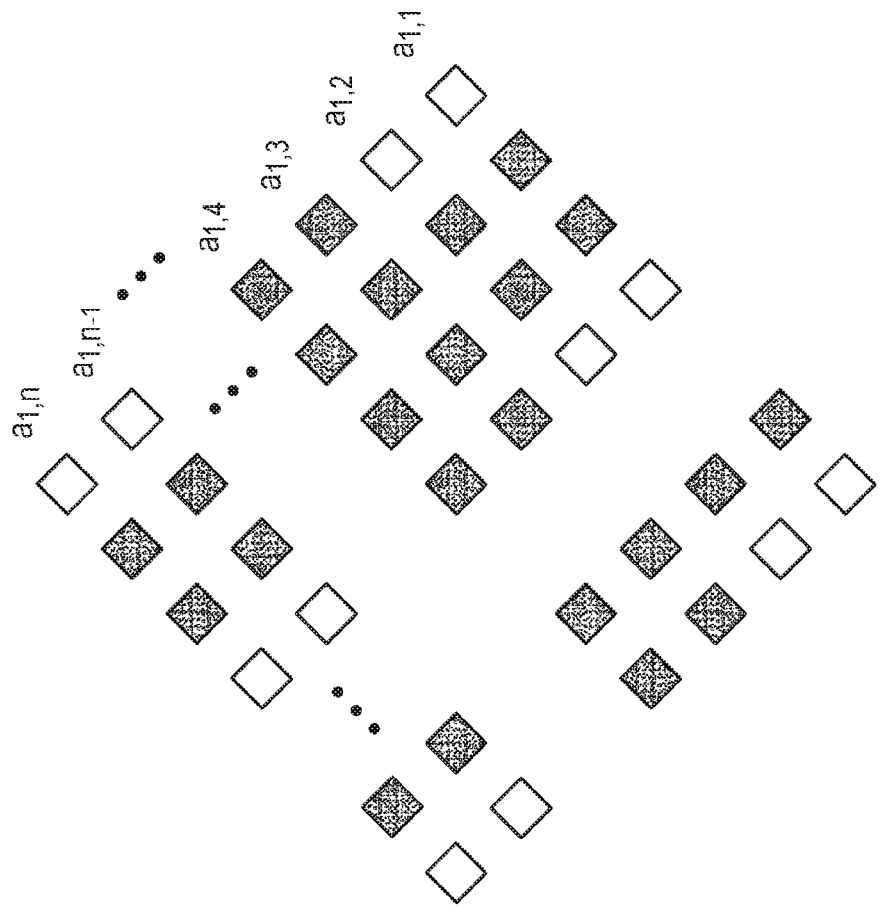

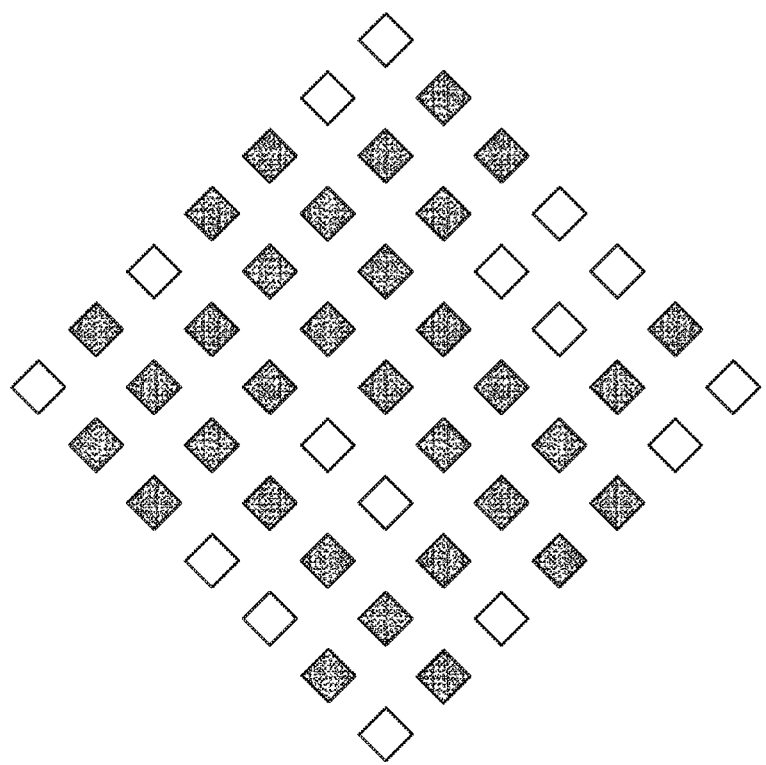

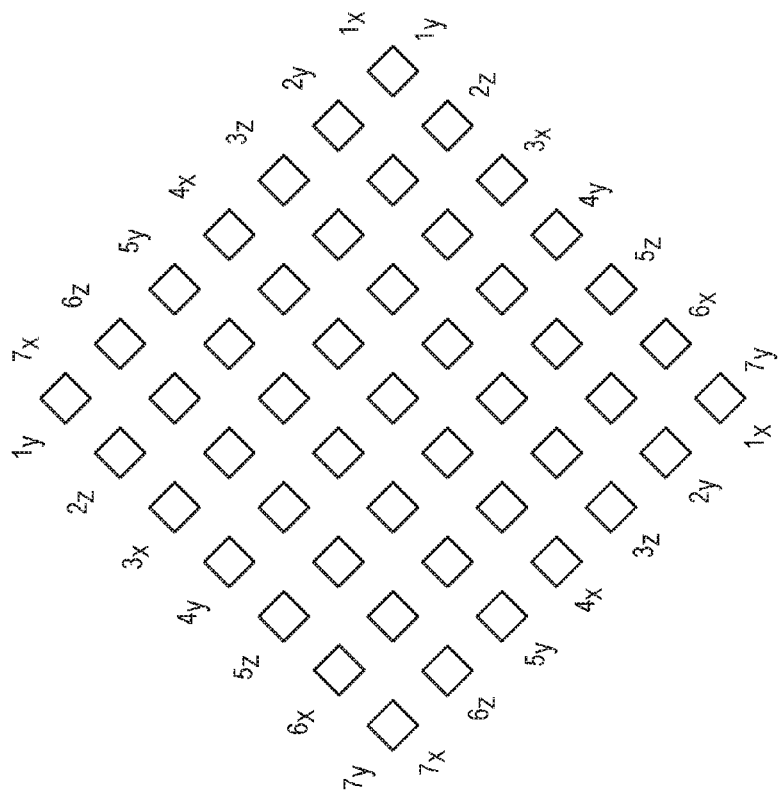

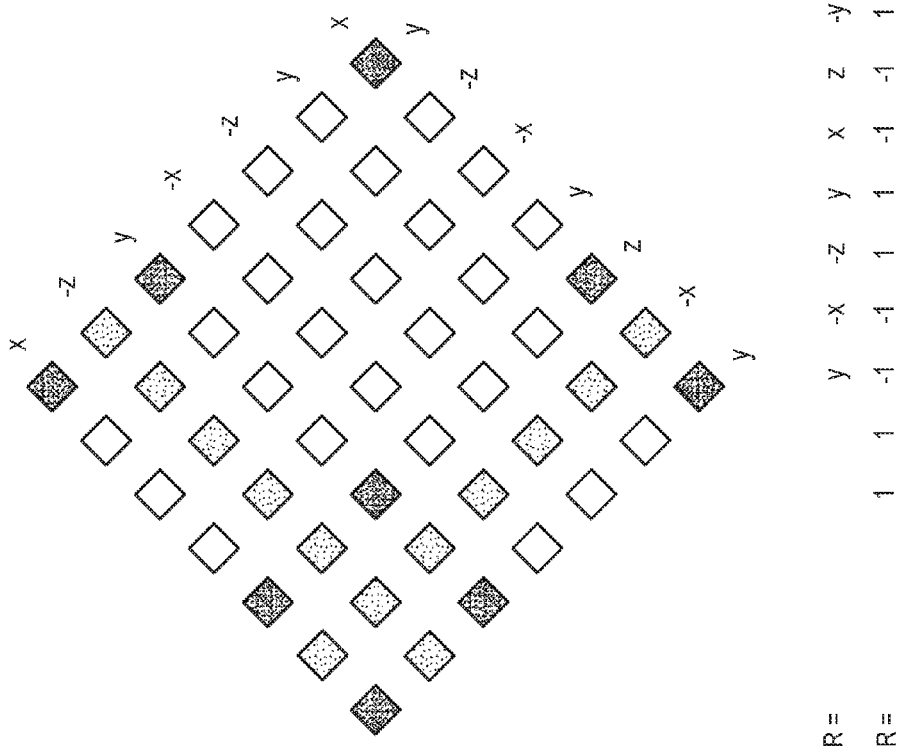

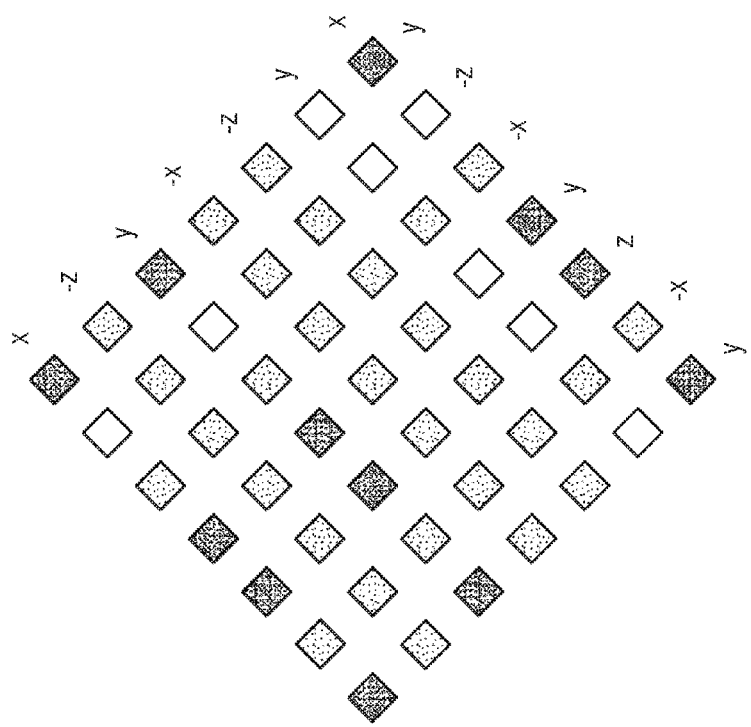

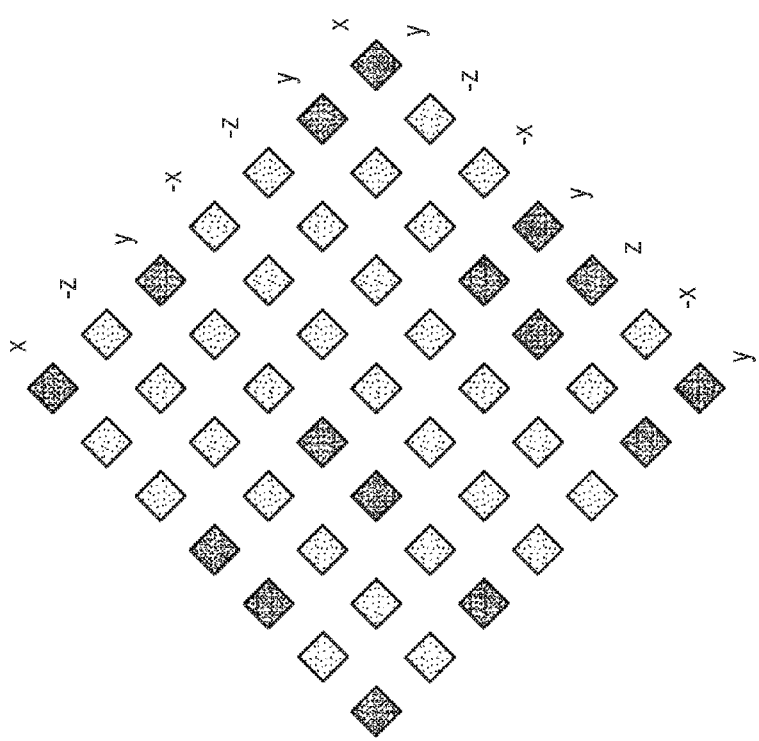

NONDETERMINISTIC TURING MACHINE COMPUTER ARCHITECTURE FOR EFFICIENT PROCESSING USING SPATIAL RELATIONSHIPS

CROSS-REFERENCE TO RELATED APPLICATIONS

This application is related to U.S. Pat. No. 9,342,788 B2, which is hereby incorporated by reference herein.

BACKGROUND

The term "Turing machine" refers to a theoretical computing device that performs computations in a manner first postulated by Alan Turing. Most modern electrical computers are instantiations of Turing machines. In general, a Turing machine may be understood as a device that has the ability to read symbols stored on, and to write symbols onto, an endless tape. The tape may be initialized to contain one or more symbols. Furthermore, the Turing machine has a "state" which may change over time. Often such states are described using simple labels, such as numbers (e.g., states 1, 2, and 3) or letters (e.g., states A, B, and C), but the particular labels that are used to identify states is not important.

As described in more detail in U.S. Pat. No. 9,342,788, which is hereby incorporated by reference herein, a Turing machine may be deterministic or nondeterministic. In a deterministic Turing machine, the set of rules that is associated with the Turing machine unambiguously specify the action(s) to be performed for each state-input combination. In contrast, the rules associated with a non-deterministic Turing machine (NTM) may specify two or more alternate actions to be performed for a state-input combination.

As the description above implies, in a deterministic Turing machine, the combination of the current state and current input uniquely (i.e., unambiguously) specify the symbol (if any) to be written at the current position, the direction (if any) to move the head, and the new state of the Turing machine (which may be the same as the current state). As the description above further implies, in a nondeterministic Turing machine, the combination of the current state and current input do not necessarily uniquely specify the symbol (if any) to be written at the current position, the direction (if any) to move the head, and the new state of the Turing machine (which may be the same as the current state). A nondeterministic Turing machine is nondeterministic, therefore, because the combination of the current state and the current input do not necessarily determine the symbol to be written by the Turing machine at the current position, the Turing machine's next state, and the Turing machine's next position.

U.S. Pat. No. 9,342,788 discloses a nondeterministic Turing machine. In particular, U.S. Pat. No. 9,342,788 discloses techniques for constructing a nondeterministic Turing machine from a deterministic Turing machine. Such a nondeterministic Turing machine presents opportunities for solving a variety of problems.

SUMMARY

A nondeterministic Turing machine (NTM) performs computations, such as factorization and arithmetic, using a spatial binary enumeration system, a three-dimensional relation system, a simulated-human logic system, and a bijective-set memory system. The NTM may be constructed by a deterministic Turing machine (DTM) using the four systems listed above.

Other features and advantages of various aspects and embodiments of the present invention will become apparent from the following description and from the claims.

BRIEF DESCRIPTION OF THE DRAWINGS

FIG. 2 is an illustration of numbers represented in the Arabic number system and in the spatial binary number system of embodiments of the present invention;

FIGS. 3A-3G are diagrams illustrating the 3-dimensional spatial binary enumeration system of embodiments of the present invention;

FIGS. 6A-6G illustrate a method for factoring a number into two factors according to one embodiment of the present invention;

FIG. 7B is an illustration of the set of partial products of FIG. 7A represented in a diagonal form according to an embodiment of the present invention;

FIG. 7D is an illustration of the complement of the product of FIG. 7C according to an embodiment of the present invention; and FIGS. 8A-8I illustrate a method for factorizing a product into two factors (multiplicands) according to an embodiment of the present invention.

DETAILED DESCRIPTION

In general, nondeterministic Turing machines (NTMs) implemented according to embodiments of the present invention include four subsystems: (1) a spatial binary enumeration system; (2) a 3-dimensional relation system; (3) a simulated human logic system; and (4) a bijective-set memory system.

Figure 1:
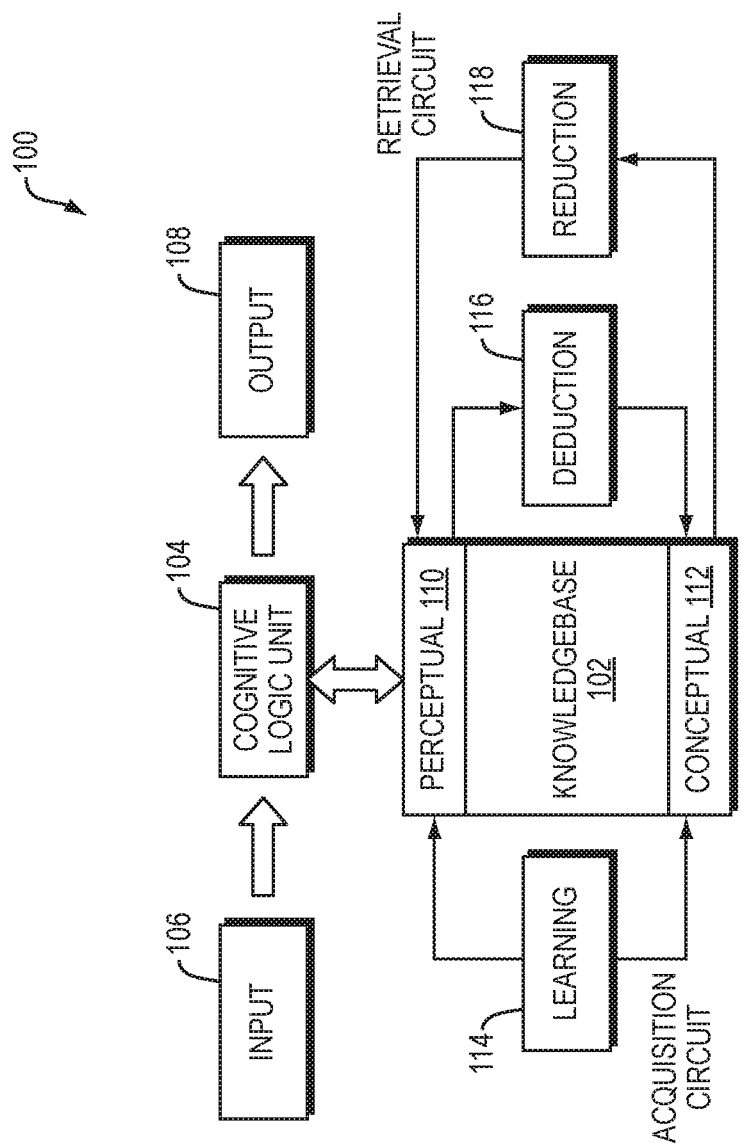
FIG. 1 is a diagram of a nondeterministic Turing machine according to one embodiment of the present invention.

For example, referring to FIG. 1, a diagram is shown of a nondeterministic Turing machine (NTM) 100 according to one embodiment of the present invention. The NTM 100 includes a memory 102, referred to herein as a "bijective set" memory, because it contains data representing bidirectional relationships, as will be described in more detail below. The memory 102 is also referred to herein as a "knowledgebase," as that term is used in U.S. Pat. No. 6,611,841. The NTM 100 also includes a simulated human logic system 104, which is also referred to herein as a cognitive logic unit or a parallel information processor. The cognitive logic unit 104 does not work in the same way as a conventional central processing unit (CPU). Rather, the cognitive logic unit 104 works as a "set operator," which causes the entire NTM 100 to work as a set operator. The cognitive logic unit 104 reads input 106 and, based on the input and the contents of the memory 102, produces output 108. For example, and as will be described in more detail below, the cognitive logic unit 104 may perform one or more set operations on its input 106 (e.g., deductively and/or reductively) to produce its output 108, which represents the result of performing the set operation(s) on the input 106. Since the NTM 100 is nondeterministic, the bijective set memory 102 may contain data representing relationships among data in the sense described above in the Background section. The entire NTM 100, however, may be implemented using a deterministic Turing machine (DTM). In such embodiments, the NTM 100 uses a DTM to perform the functions of an NTM. The NTM 100 may, therefore, use a DTM to construct an NTM.

Examples of the bijective set memory 102, and of techniques for storing data in the bijective set memory, are described in more detail in U.S. Pat. No. 6,611,841, entitled, "Knowledge Acquisition and Retrieval Apparatus and Method," issued on Aug. 26, 2003; U.S. Prov. Pat. App. No. 61/798,848, entitled, "Sequence Alignment," filed on Mar. 15, 2013; and PCT App. No. PCT/US2014/027455, entitled, "Spatial Arithmetic Method of Sequence Alignment," filed on Mar. 14, 2014, all of which are hereby incorporated by reference herein.

A very brief summary of the bijective set memory 102 will be provided here. Further details are available in the above-referenced documents. In general, the bijective set memory 102 is based on an understanding of, and operates in a manner that is analogous to, the operation of the human brain. In particular, the bijective set memory 102 may contain two memories: a perceptual memory 110 and a conceptual memory 112. The perceptual memory 110 stores data representing perceptions, such as perceptions of objects. The conceptual memory 112 stores data representing conceptions (also referred to herein as concepts and classes). The conceptions represented by data stored in the conceptual memory 112 may be considered to be sets, while the perceptions represented by data stored in the perceptual memory 110 may be considered to be elements of the sets represented by the data stored in the conceptual memory 112.

The NTM 100 includes an induction module 114 (also referred to herein as a learning module or a concept formation module), which learns natural relationships between perceptions represented by data stored in the perceptual memory 110 and concepts represented by data stored in the conceptual memory 112, using a process of induction. For each relationship that the learning module 114 learns between a perception in the perceptual memory 110 and a corresponding concept in the conceptual memory 112, the learning module 114 generates and stores a two-way mapping between the data representing the perception in the perceptual memory 110 and the data representing the corresponding concept in the conceptual memory 112. The process performed by the learning module 114 of generating and storing such mappings for an increasingly large number of perceptions and corresponding concepts models the learning process performed by the human brain. The resulting set of mappings is an example of a "knowledgebase" as that term is used herein, and as that term is used in U.S. Pat. No. 6,611,841.

Once the learning module 114 has developed a knowledgebase containing two-way mappings between the perceptions represented by data stored in the perceptual memory 110 and the concepts represented by data stored in the conceptual memory 112, knowledge stored in the knowledgebase may be retrieved in any of a variety of ways. For example, the NTM 100 includes a deduction module 116 which may retrieve knowledge from the knowledgebase using deduction. In particular, if data representing a perception in the perceptual memory 110 is provided as input to the deduction module 116, then the deduction module 116 may follow the mapping(s) (i.e., relationships) from the perception in the perceptual memory 110 to the corresponding concept(s) in the conceptual memory 112, and thereby retrieve the concept(s) that correspond to the perception.

As another example, the NTM includes a reduction module 118 which may retrieve knowledge from the knowledgebase using reduction. In particular, if data representing a class (also referred to herein as a concept, conception, or set) in the conceptual memory 112 is provided as input to the reduction module 118, then the reduction module 118 may follow the mapping(s) from the concept in the conceptual memory 112 to the corresponding perception(s) in the perceptual memory 110, and thereby retrieve the perception(s) that correspond to the concept.

As mentioned above, NTMs implemented according to embodiments of the present invention include a spatial binary enumeration system, which refers to an enumeration system which enumerates numbers based on a set consisting of two fundamental (primitive) elements, which may be conceived of as representing +1 and −1.

Therefore, although the conventional binary number system also is based on two fundamental (primitive) elements, namely 0 and 1, the spatial binary enumeration system disclosed herein has a variety of advantages over the conventional binary number system that is based on 0 and 1. In particular, the spatial binary enumeration system disclosed herein is based on primitive elements having values that are equal in magnitude and opposite (i.e., complementary) in direction to each other, such as −1 and +1. In contrast, the primitive values of 0 and 1 in the conventional binary number system are not equal and opposite to each other. The spatial binary enumeration system's use of primitive values that are equal in value but opposite in direction to each other enables computations to be performed more efficiently than using the conventional binary number system.

As will be described in more detail below, the use of +1 and −1 as primitive values enables numbers represented as combinations of +1 and −1 to be represented as three-dimensional points in a three-dimensional space more easily and directly than numbers represented as combinations of +1 and 0. This further facilitates use of such numbers to perform arithmetic (such as multiplication, division, addition, or subtraction), factorization, and other arithmetic and logical operations more easily than conventional binary numbers composed of primitive values of 0 and 1.

Because the use of +1 and −1 to represent numbers is new, there is no existing terminology to refer to a number which has permissible values consisting of the set {+1, −1}. The existing term "bit" refers to a number which has a range of permissible values consisting of the set {+1, 0}. For ease of explanation, and because embodiments of the present invention may use either a representation based on {+1, 0} or {1+, −1}, the term "bit" will be used herein to refer both to numbers that have a range of permissible values consisting of the set {+1, 0} and to numbers that have a range of permissible values consisting of the set {+1, −1}. Similarly, the term "binary number" will be used herein to refer to any number consisting of bits, whether such bits have a range of {+1, 0} or {+1, −1}. For example, both the number 10011010 and the number +1−1−1+1+1−1+1−1 will be referred to herein as "binary numbers," even though the number +1−1−+1−1−1+1+1−1+1−1 does not contain "bits" in the conventional sense. The term "spatial binary number" will be used to refer specifically to numbers containing bits having a range of {+1, −1} when it is desired to refer to such numbers specifically.

Referring to FIG. 2, an illustration is shown of the use of the spatial binary enumeration system, as implemented according to an embodiment of the present invention, to enumerate the numbers −9 through +9. In this illustration, a spatial binary number whose leftmost bit is −1 is a negative number, while a spatial binary number whose leftmost bit is +1 is a positive number.

Furthermore, each positive spatial binary number may be read in a manner similar to a conventional binary number, but in which each +1 is equivalent to a binary 1 and in which each −1 is equivalent to a binary 0. For example, as shown in FIG. 2, the spatial binary number +1−1+1 is a positive number, because its leftmost bit is +1. Therefore, the spatial binary number +1−1+1 may be read in the same manner as binary 101, which is equal to Arabic 5. Any other spatial binary number may be represented similarly.

Furthermore, each negative spatial binary number may be read in a manner similar to a conventional binary number, but in which each −1 is equivalent to a binary 1, in which each +1 is equivalent to a binary 0, and in which the sign of the overall number is reversed. For example, as shown in FIG. 2, the spatial binary number −1+1−1 is a negative number, because its leftmost symbol is −1. Therefore, the spatial binary number −1+1−1 may be read in the same manner as binary 101, which is equal to Arabic 5, but with its sign reversed, so that it is equal to Arabic −5. Any other spatial binary number may be represented similarly.

As mentioned above, the spatial binary enumeration system disclosed herein may be used to perform computations with high efficiency. In particular, the spatial binary enumeration system enables computations to be performed by the nondeterministic Turing machine 100 (e.g., by the cognitive logic unit 104) in logarithmic time, rather than exponential time. Examples of such computations are provided, for example, in U.S. Pat. App. Ser. No. 13/188,122, filed on Jul. 21, 2011, entitled, "Knowledge Reasoning Method of Boolean Satisfiability (SAT)", and in U.S. Pat. App. Ser. No. 14/191,384, filed on Feb. 26, 2014, entitled, "Spatial Arithmetic Method of Integer Factorization," both of which are hereby incorporated by reference herein.

As a particular example, addition and subtraction may be performed as follows. For example, in one embodiment of the present invention, addition of two primitive operands, labeled herein as (−1) and (+1) may be performed by the nondeterministic Turing machine 100 (e.g., by the cognitive logic unit 104) according to the following rules:
(−1)+(−1)=(−1)
(−1)+(+1)=(+1)
(+1)+(−1)=(+1)
(+1)+(+1)=(−1), carry (+1)

According to this scheme, any two numbers of any length (i.e., consisting of an ordered sequence of any number of primitive operands in any combination) may be added by the nondeterministic Turing machine 100 (e.g., by the cognitive logic unit 104) according to the rules listed above. Similarly, subtraction of the two primitive operands may be performed by the nondeterministic Turing machine 100 (e.g., by the cognitive logic unit 104) according to the following rules:
(−1)−(−1)=(−1)
(−1)−(+1)=(+1), borrow (+1)
(+1)−(−1)=(+1)
(−1)−(+1)=(−1)

According to this scheme, any two numbers of any length (i.e., consisting of an ordered sequence of any number of primitive operands in any combination) may be subtracted by the nondeterministic Turing machine 100 (e.g., by the cognitive logic unit 104) according to the rules listed above.

Alternatively, for example, the following rules may be used to perform addition:
(−1)+(−1)=(+1), carry (−1)
(−1)+(+1)=(−1)
(+1)+(−1)=(−1)
(+1)+(+1)=(+1)

In this case, the following rules may be used to perform subtraction:
(+1)−(+1)=(+1)
(+1)−(−1)=(−1), borrow (−1)
(−1)−(+1)=(−1)
(−1)−(−1)=(+1)

Whether the first set of addition/subtraction rules or the second set of addition/subtraction rules above are used by the nondeterministic Turing machine 100 (e.g., by the cognitive logic unit 104) to perform addition and subtraction, the spatial binary enumeration system of embodiments of the present invention provides a mechanism for performing both addition and subtraction using simple rules that enable both addition and subtraction to be performed using the same algorithm, without the need for a special algorithm for performing subtraction. This is merely one example of an advantage of embodiments of the present invention over conventional computing techniques.

As mentioned above, NTMs implemented according to embodiments of the present invention include a 3-dimensional relation system. Such a system is described in detail in U.S. patent application Ser. No. 14/191,384, filed on Feb. 26, 2014, entitled, "Spatial Binary Method of Integer Factorization," which is hereby incorporated by reference herein. Therefore, only a brief summary of the 3-dimensional relation system will be described herein.

For example, the NTM 100 may map the x, y, and z dimensions in a three-dimensional space to the powers of 2 (i.e., 0, 1, 2, 4, 8, 16, etc.) in a repeating pattern. More specifically, the NTM 100 may select an order for the x, y, and z dimensions. Such orders include the following: (1) x, y, z; (2) y, z, x; (3) z, x, y; (4) x, z, y; (5) z, y, x; and (6) y, x, z. Any of these orders may be chosen. Once such an order is chosen, the order may be repeated and the repeating sequence of dimensions may be mapped to the powers of 2.

Assume, for example, that the order x, y, z is selected. When the three dimensions in this order are repeated, they may form the following repeating pattern: x, y, z, x, y, z, x, y, z, and so on, infinitely.

Now consider any particular binary number A. The NTM 100 may produce or otherwise identify and store (e.g., in the memory 102) a three-dimensional representation of the binary number A by mapping the bits in the binary number A to the x, y, and z dimensions using a mapping such as the one described above, and then by producing a corresponding ordered set of three-dimensional relations. As an example, consider the spatial binary number +1−1−1+1+1−1+1−1, which may be mapped to the x, y, and z dimensions as follows: +1y−1x−1z+1y+1x−1z+1y−1x.

Note that, in this example, the bits of the binary number A have been mapped to the x, y, and z dimensions in the previously-selected order (e.g., x, y, z), starting with the rightmost bit of the binary number A, and proceeding to the left one bit at a time. For example, assume that the dimensions x, y, and z have been assigned the order x, y, z (in a repeating pattern). Therefore:

the first (rightmost) bit in the binary number A has been mapped to the first dimension in the selected order of dimensions (namely, the x dimension in this example);

the second bit in the binary number A has been mapped to the second dimension in the selected order of dimensions (namely, the y dimension in this example);

the third bit in the binary number A has been mapped to the third dimension in the selected order of dimensions (namely, the z dimension in this example);

the fourth bit in the binary number A has been mapped to the first dimension in the selected order of dimensions (namely, the x dimension in this example), based on the repeating pattern of the dimensions;

and so on.

The NTM 100 may use such a representation of a mapping between binary number A and the x, y, and z dimensions to create a three-dimensional representation of the binary number A in a three-dimensional space, and to store the representation of the binary number A in the knowledgebase 102. When creating such a three-dimensional representation of a binary number, for each bit in the number, the NTM 100 creates a representation of a corresponding point in three-dimensional space, and stores the representation of the corresponding point in the knowledgebase 102. When the NTM 100 creates a representation of a point in three-dimensional space corresponding to a particular bit, both the dimension to which that bit is mapped and the bit position of that bit are used to create the representation of the point. Therefore, to aid in the understanding of how the mapping of a binary number to dimensions is used to create a three-dimensional representation of the number, we will further refine the textual representation of the mapping by including a subscript after each dimension to represent the bit position that corresponds to the dimension. For example, we may insert such subscripts into the mapping +1y−1x−1z+1y+1x−1z+1y−1x to create a revised mapping of +1y$_8$−1x$_7$−1z$_6$+1y$_5$+1x$_4$−1z$_3$+1y$_2$−1x$_1$, in which each subscript represents the bit position of the corresponding bit.

In this representation, each bit in a binary number is represented by four symbols: (1) either a + or a −, representing the sign of the bit (positive or negative), which corresponds to the direction of the relation of the bit to the previous bit in three-dimensional space; (2) the number 1; (3) a symbol representing the dimension (x, y, or z) to which the bit is mapped in three-dimensional space; and (4) a subscript representing the position of the bit in the binary number. For example, the rightmost bit in the binary number above is represented by the four symbols −1x$_1$, indicating that the sign of the bit is negative, that the bit is mapped to the x dimension, and that the bit is at position one in the binary number.

As mentioned above, the three dimensions may be mapped to bit positions in any sequence (e.g., xyz, yzx, zxy). Once such a sequence is picked, such a sequence determines an order of the layers in the 3-dimensional model described above. Since any sequence of dimensions may be chosen, any particular number may be represented in any of three equivalent ways as points in three-dimensional space.

In 3-dimensional space, each dimension has a positive direction and a negative direction. These directions may be represented as follows:

+1x (x dimension, positive direction);
−1x (x dimension, negative direction);
+1y (y dimension, positive direction);
−1y (y dimension, negative direction);
+1z (z dimension, positive direction); and
−1y (z dimension, positive direction).

These may be combined together into 8 types of triplets, also referred to herein as "relation types":

−1z−1y−1x;
−1z−1y+1x;
−1z+1y−1x;
−1z+1y+1x;
+1z−1y−1x;
+1z−1y+1x;
+1z+1y−1x; and
+1z+1y+1x.

Figure 3A:
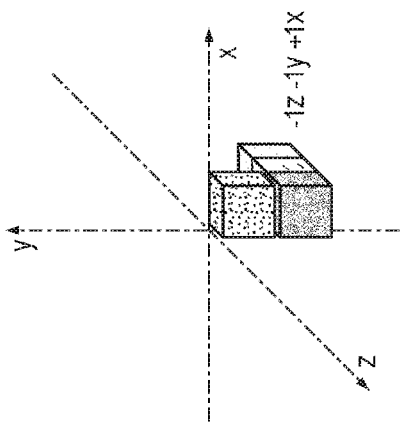
Figure 3A:
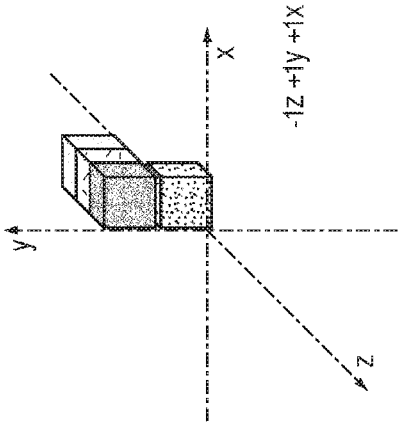
Figure 3A:
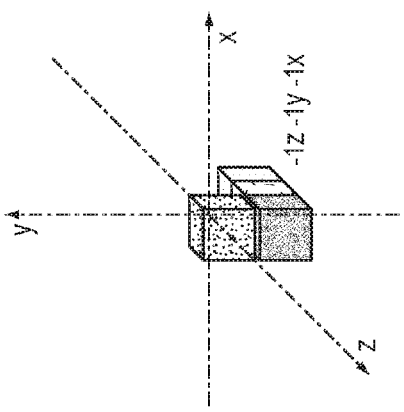
Figure 3A:
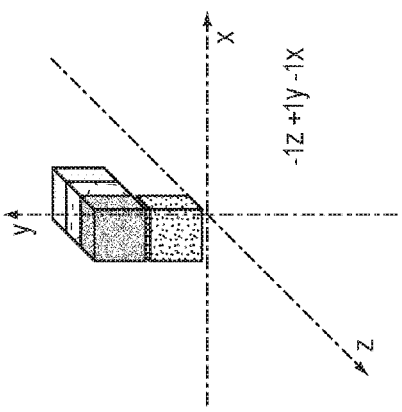

Graphical representations of these eight basic triplets are shown in FIGS. 3A-3B. Any two such triplets may be combined together in 64 possible ways. These 64 combinations represent the complete set of combinatorial types in a 3-dimensional space. Therefore, any information in 3-dimensional space may be presented using these 64 combinations of triplets.

Note that each colored cube in the triplets shown in FIGS. 3A-3B represents a bit in the corresponding binary number. For example, the three-dimensional representation shown in the upper left of FIG. 3A represents the decimal number −7, which is equal to the spatial binary number −1−1−1, which may be represented by the mapping −1x$_3$−1y$_2$−1z$_1$. In this example, in the representation in the upper left of FIG. 3A:

the colored cube located at coordinates x=−1, y=−1, z=−1 represents the bit −1z$_1$;

the colored cube located at coordinates x=−1, y=−2, z=−1 represents the bit −1y$_2$; and the colored cube located at coordinates x=−3, y=−2, z=−1 represents the bit −1x$_3$.

Note also that each colored cube is connected to the next colored cube in the sequence by an edge consisting of zero or more non-colored cubes. For example, consider the successive bits −1y$_2$ and −1x$_3$ in the example illustrated in the upper left of FIG. 3A. Note that the colored cubes representing these bits are connected by a single non-colored cube. This connection is an edge representing a spatial relationship between the successive bits −1y$_2$ and −1x$_3$. In this way, the NTM 100 may create and store both: (1) three-dimensional representations of individual bits within binary numbers, and (2) representations of spatial relationships among bits within binary numbers.

In summary, and as described in more detail in the above-referenced patent applications entitled, "Spatial Arithmetic Method of Integer Factorization" and "Spatial Arithmetic Method of Sequence Alignment," according to the 3-dimensional relation aspect of embodiments of the present invention:

Every number may be represented by a layered set of 3-dimensional relations.

Each layer indicates a corresponding bit position.

Each number is read from the outside layer to the inside layer.

All numbers of combinations of −1 and +1.

All numbers are ordered within three dimensions.

Each number has three equivalent representations. A graphical representation of the three equivalent representations of a particular number is shown in FIG. 3C.

Positive (+) and negative (−) are opposite directions.

In the 3-dimensional relation system of embodiments of the present invention, all numbers can be represented by combinations of triplets. Furthermore, the 3-dimensional enumeration of embodiments of the present invention reduces the complexity of computation. Yet furthermore, the 3-dimensional enumeration of embodiments of the present invention enables the proof that P=NP.

The enumeration of the decimal numbers −9 through −1 and 1 through 9 in FIG. 2 merely represents the numerical enumeration of such numbers (also referred to as their "ordinality"). Embodiments of the present invention may be used not only to perform such numerical enumeration, but also to enumerate numbers in a three-dimensional space (where such spatial enumeration is referred to as "cardinality"). In particular, embodiments of the present invention may be used to enumerate both the ordinality and cardinality of the positive integers (e.g., decimal numbers 1, 2, 3, etc.), the negative integers (e.g., decimal numbers −1, −2, −3, etc.), and any fractions thereof (e.g., ½, ¼, ⅛, etc.).

Figure 3D:
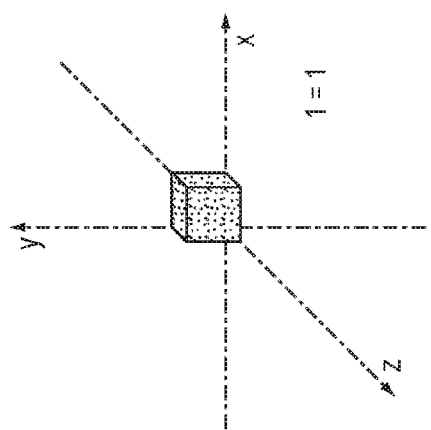
Figure 3E:
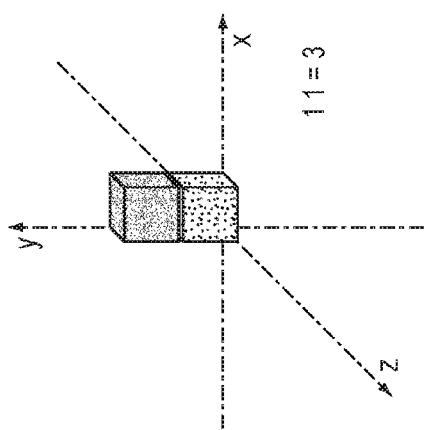
Figure 3F:
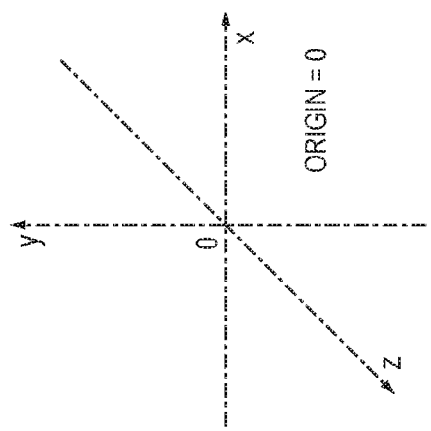

For example, FIGS. 3D, 3E, and 3F illustrate three-dimensional representations of the number 0 and the decimal numbers 1 (spatial binary +1), 2 (spatial binary +1−1), and 3 (spatial binary +1+1). First, consider the origin point at (0, 0, 0), illustrated in FIG. 1E. This point represents the number zero.

Now consider the decimal number 1, which is equal to the binary +1. To construct a three-dimensional representation of this number, assume that the order of the dimensions is x, y, z. The NTM 100 constructs a three-dimensional representation of the binary number +1, and stores the resulting three-dimensional representation in the knowledgebase 102, by reading each bit in the number and creating a point in three-dimensional space corresponding to that bit, to create a set of three-dimensional points corresponding to the number, and storing representations of those three-dimensional points in the knowledgebase 102. Because the binary number +1 only contains 1 bit, the corresponding representation of the binary number +1 in three-dimensional space consists of exactly one representation of one point in three-dimensional space, namely a single point corresponding to the bit +1.

More specifically, the NTM 100 reads the number to be represented in three-dimensional space one bit at a time, starting with the lowest bit on the right and moving toward the highest bit on the left in sequence to the next highest bit until the highest bit in the number is reached. The NTM 100 creates and stores in the knowledgebase 102, for each such bit, a representation of a corresponding point in three dimensional space.

Recall that the three dimensions are assigned a particular order. Assume for purposes of example that the dimensions are assigned an order of x, y, z. Therefore, in this example, NTM 100 associates the first (lowest) bit in a number with the x dimension, the NTM 100 associates the second (next-lowest) bit in the number with the y dimension, the NTM 100 associates the third (next-lowest) bit in any number with the z dimension, the NTM 100 associates the fourth (next-lowest) bit in any number with the x dimension, and so on. In other words, the NTM 100 assigns bits in the number to the x, y, and z dimensions in a repeating pattern (in whatever order has been assigned to the x, y, and z dimensions), starting with the lowest bit of the number and continuing bit-by-bit until the highest bit of the number is reached.

The NTM 100 associates each dimension with a corresponding number, starting with 1, and increasing incrementally, in a repeating pattern of dimensions. For example, if the dimensions are assigned the order x, y, z, then the number 1 may be associated with the x dimension 1, the number 2 may be associated with the dimension y, the number 3 may be associated with the dimension z, the number 4 may be assigned to the dimension x, and so on. As this example illustrates, each dimension may be associated with more than one number, depending on the corresponding bit position. Each bit position may be designated with a subscript after the corresponding dimension, such as $x_1$, $y_2$, $z_3$, $x_4$, $y_5$, $z_6$, etc. The assignment of bits in a binary number may be designated by writing each bit followed by its associated dimension. For example, the binary number +1−1+1+1+1−1 may be written as $+1x_1-1y_2+1z_3+1x_4+1y_5-1z_6$.

Techniques that may be used to represent binary numbers in three-dimensional space according to embodiments of the present invention will now be described. First consider the decimal number 1, which is equal to the binary number +1. The lowest bit of this number is assigned to the first dimension in the assigned order of dimensions. In this case, the lowest bit is equal to +1, and the first dimension is the x dimension. Therefore the value of +1 is assigned to the x dimension. As described above, this may be written as $+1x_1$.

The NTM 100 may create a representation of a point in three-dimensional space representing $+1x_1$ may to represent the first bit of the binary number +1. The NTM 100 may create a representation of a point in three-dimensional space representing $+1x_1$ (which may alternatively be written as $x_1$) may be created by starting at the origin point and moving along the axis indicated by $+1x_1$ (namely, the x axis), in the direction indicated by $+1x_1$ (namely, in the positive direction), to the coordinate on the x axis indicated by the subscript of $+1x_1$ (namely, to the coordinate x=0). This results in the creation of a representation of a point at $x_1=1$, $y_1=1$, $z_1=1$. This single point represents the binary number 1. Note that coordinates of x=0, y=0, and z=0 are only used to represent the number 0, namely by the origin at (0, 0, 0). No other number is represented by a point having any coordinate equal to zero.

Now consider the decimal number 2, which is equal to the conventional binary number 10 and to the spatial binary number +1−1. These two bits, starting with the lowest bit and moving bit-by-bit to the highest bit, may be assigned to the x and y dimensions, respectively. For example, the spatial binary number +1−1 may be assigned to the x and y dimensions to produce a mapping of the spatial binary number +1−1 to the representation $+1y_2-1x_1$.

Based on this assignment of bits to dimensions, and as shown in FIG. 3E, the spatial binary number +1−1 may be represented in three-dimensional space by a collection of points, each of which corresponds to a corresponding bit in the spatial binary number +1−1. In particular, because the spatial binary number +1−1 contains exactly two bits, the spatial binary number +1−1 is represented by exactly two points in three-dimensional space in FIG. 3E. More specifically, reading from the lowest bit to the highest bit:

the lowest bit in $+1y_2-1x_1$ (i.e., the rightmost bit, having a value of $-1x_1$), is represented by a point at x=−1, y=1, z=1;

the next-lowest bit in $+1y_2-1x_1$ (i.e., the leftmost bit, having a value of $+1y_2$), is represented by a point at x=−1, y=2, z=1, as the result of moving from the previous point (x=−1, y=1, z=1) in the positive direction on the y axis to the coordinate y=2.

The resulting three-dimensional representation of decimal 2 is, as shown in FIG. 3F, a set of exactly two points at coordinates (x=−1, y=1, z=1) and (x=−1, y=2, z=1). Note that in the case of a one-bit or two-bit number, the z coordinates (or more generally, the coordinates of the third dimension in the ordered sequence of dimensions) may be chosen arbitrarily because the z (third) coordinate is not necessary to represent the number.

Now consider the decimal number 3, which is equal to the conventional binary number 11 and to the spatial binary number +1+1. These two bits, starting with the lowest bit and moving bit-by-bit to the highest bit, may be assigned to the x, y, and z dimensions. As a result, the spatial binary number +1+1 may be assigned to the x, y, and z dimensions to produce $+1y_2+1x_1$.

Figure 3G:
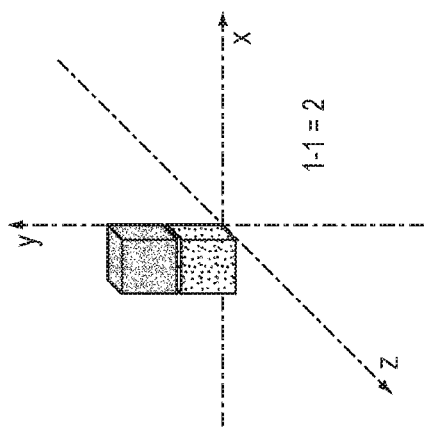

Based on this assignment of bits to dimensions, and as shown in FIG. 3G, the binary number +1+1 may be represented in three-dimensional space by a collection of points, each of which corresponds to a corresponding bit in the spatial binary number +1+1. In particular, because the spatial binary number +1+1 contains exactly two bits, the spatial binary number +1+1 is represented by exactly two points in three-dimensional space in FIG. 3G. More specifically, reading from the lowest bit to the highest bit:

the lowest bit in $+1y_2+1x_1$ (i.e., the rightmost bit, having a value of $+1x_1$), is represented by a point at x=1, y=1, z=1;

the next-lowest bit in $+1y_2+1x_1$ (i.e., the leftmost bit, having a value of $+1y_2$), is represented by a point at x=1, y=2, z=1, as the result of moving from the previous point (x=1, y=1, z=1) in the positive direction on the y axis to the coordinate y=2.

The resulting three-dimensional representation of decimal 3 is, as shown in FIG. G, a set of exactly two points at coordinates (x=+1, y=1, z=1) and (x=1, y=2, z=1).

Those having ordinary skill in the art will appreciate how to represent enumerate and represent additional numbers, both positive and negative, in the three-dimensional space illustrates in FIGS. 3D-3G. As further mentioned above, NTMs according to embodiments of the present invention include a simulated human logic system in the form of the cognitive logic unit 104. The cognitive logic unit 104 is built on the recognition that there is a natural order to the three-dimensional relation system described herein and to knowledge more generally. For example, the human brain naturally sorts information in order to organize it. Similarly, nature automatically connects proteins to each other in certain orders and not others. Similarly, logic systems implemented in the cognitive logic unit 104 automatically organize information into relations within the bijective set memory 102.

As described above and as further described in U.S. Pat. No. 6,611,841, data representing perceptions, concepts, and relationships between the perceptions and concepts may be stored in the knowledgebase 102. Each such perception and concept may be represented by data in the knowledgebase 102 in the form of a spatial binary number having the form described herein. For example, a particular perception (object) may be represented in the knowledgebase 102 by data representing a three-dimensional representation of a spatial binary number of the kind described above. Similarly, a particular concept (class) may be represented in the knowledgebase 102 by data representing a three-dimensional representation of a spatial binary number of the kind described above. Relationships between spatial binary numbers in the knowledgebase 102 may represent relationships between the perceptions and/or concepts represented by those spatial binary numbers.

For example, consider the perceptions "George Washington" and "Abraham Lincoln." Each such perception may be represented in the knowledgebase 102 by a distinct spatial binary number. Similarly, consider the concepts "President" and "Politician." Each such concept may be represented in the knowledgebase 102 by a distinct spatial binary number. The relationships between such perceptions and concepts may be represented by relationships between the corresponding spatial binary numbers. For example, the fact that "George Washington" is a member of the class "President" may be represented in the knowledgebase 102 by a relationship between the spatial binary number representing the perception "George Washington" and the spatial binary number representing the concept "President."

The use of spatial binary numbers to represent perceptions and concepts in the knowledgebase 102 enables the knowledgebase 102 to store an index of all of the perceptions and concepts stored in the knowledgebase 102. Each spatial binary number in the knowledgebase 102 acts as an index into the knowledgebase 102. In other words, the content of each memory location in the knowledgebase 102 serves as its own address. As a result, if the NTM 100 is presented with a particular spatial binary number as the input 106 to the NTM 100, the cognitive logic unit 104 may use that spatial binary number as an index into the knowledgebase 102 to retrieve the relationships of that spatial binary number stored in the knowledgebase 102 in an amount of time that is a quadratic function of the length of the spatial binary number.

The cognitive logic unit 104 may perform a variety of functions, such as the induction, deduction, and reduction functions disclosed above in connection with the learning module 114 (which learns and stores relations), deduction module 116 (which maps element information to set information), and reduction module 118 (which maps set information to element information) in FIG. 1. For example, the cognitive logic unit 104 may receive input 106 (such as input received from a user of the NTM 100). In response to receiving the input 106, the cognitive logic unit 104 may control the learning module 114 to perform induction on the input 106 (and possibly on previous inputs received by the NTM 100 and/or on data already stored in the knowledgebase 102), and thereby to create and store new learned knowledge in the knowledgebase 102. The cognitive logic unit 104 may then produce output 108 based on the new learned knowledge, such as output representing a concept that the induction module 114 learned based on the input 106.

As another example, in response to receiving the input 106, the cognitive logic unit 104 may control the deduction module 116 to perform deduction on the input 106 (and possibly on previous inputs received by the NTM 100 and/or on data already stored in the knowledgebase 102), and thereby to extract existing data from the knowledgebase 102 representing one or more classes of which an object represented by the input 106 is a member. The cognitive logic unit 104 may then produce output 108 based on the result of the deduction, such as output representing a class which contains an object represented by the input 106.

As another example, in response to receiving the input 106, the cognitive logic unit 104 may control the reduction module 118 to perform reduction on the input 106 (and possibly on previous inputs received by the NTM 100 and/or on data already stored in the knowledgebase 102), and thereby to extract existing data from the knowledgebase 102 representing one or more objects which are members of a class represented by the input 106. The cognitive logic unit 104 may then produce output 108 based on the result of the reduction, such as output representing one or more objects which are members of a class represented by the input 106.

As these examples illustrate, the cognitive logic unit 104 may trigger one or more of the learning module 114, the deduction module 116, and the reduction module 118 to perform their respective functions on the input 106, and the cognitive logic unit 104 may produce output 108 based on the results of the functions performed by such modules. The cognitive logic unit 104 may, therefore, act as an interface between a user of the NTM 100 and the modules 114, 116, and 118. The cognitive logic unit 104 may, therefore, also act as a controller of the modules 114, 116, and 118. The cognitive logic unit 104 may retrieve data (representing existing knowledge) from the knowledgebase 102 using the modules 114, 116, and 118. Furthermore, the cognitive logic unit 104 may store data (representing new knowledge) in the knowledgebase 102 using the modules 114, 116, and 118.

Logic systems implemented in the cognitive logic unit 104 according to embodiments of the present invention perform a variety of functions and provide a variety of benefits. For example, such logic systems enable knowledge to be learned automatically in the manner disclosed herein. In natural language and natural numbers there exist natural relations and natural logic. Humans can perceive these hidden relations automatically, but current computers are not equipped to process these relations. The cognitive logic unit 104 provides the ability to recognize natural relations, such as natural relations expressed in natural languages and natural numbers. As another example, the cognitive logic unit 104 enables knowledge to be processed in parallel. As yet another example, the cognitive logic unit 104 eliminates most of the traditional task of "programming," by replacing programming with the process of learning and then of extracting learned knowledge. For example, the cognitive logic unit 104 may extract knowledge from the knowledgebase 102 without programming as follows. The NTM 100 of FIG. 1 may receive input 106, and then:

the cognitive logic unit 104 may apply deduction 116 to the input 106 to extract existing knowledge from the knowledgebase 102 representing one or more concepts associated in the knowledgebase 102 with the presented data; and/or the cognitive logic unit 104 may apply reduction module 118 to the input 106 to extract existing knowledge from the knowledgebase 102 representing one or more objects (perceptions) associated in the knowledgebase 102 with the presented data.

In either case, no special programming need to be performed on the NTM 100 to enable concepts or perceptions to be extracted from the knowledgebase 102. Instead, the operations of deduction 116 and/or reduction 118 may be applied to the input 106 to extract concepts and perceptions without writing a separate program.

The cognitive logic unit 104 may perform set operations on output generated by the deduction module 116 and/or the reduction module 118. For example, the cognitive logic unit 104 may receive one or more outputs from either or both of the deduction module 116 and the reduction module 118, and then perform one or more set operations on such output. Examples of such set operations include intersection, union, difference, and complement operations. The cognitive logic unit 104 may then produce output representing the outcome of performing such a set operation or operations. As a simple example, consider the following:

the reduction module 118 is provided with an input representing the class of mammals and performs reduction on that input to produce output representing one or more animals which are mammals, based on the relations stored in the knowledgebase 102;

the reduction module is provided with an input representing the class of animals which live in the ocean and performs reduction on that input to produce output representing one or more animals which live in the ocean, based on the relations stored in the knowledgebase 102.

The cognitive logic unit 104 may receive, as inputs, both such outputs from the reduction module 118, and perform an intersection operation on such inputs to produce an output representing the set of mammals which live in the ocean (e.g., whales). Although only this simple example is used for purposes of explanation, the cognitive logic unit 104 may perform any type of set operation on any one or more outputs of the deduction module 116 and/or the reduction module 118.

Figure 4:
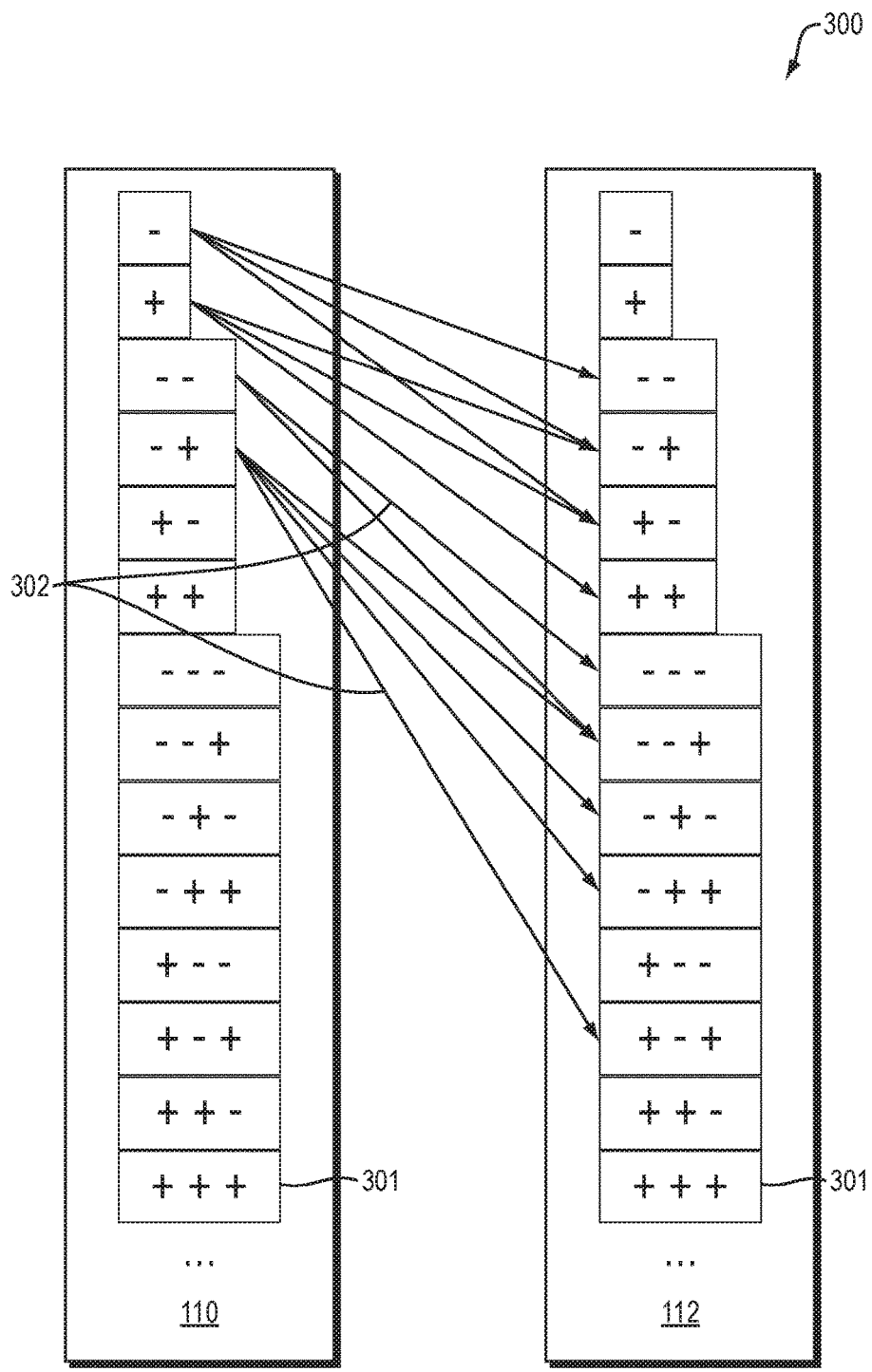
FIG. 4 is a diagram illustrating a bijective-set memory according to one embodiment of the present invention.

Referring to FIG. 4, a diagram is shown of a bijective-set memory 300 according to one embodiment of the present invention. The bijective-set memory 300 of FIG. 4 may be used to implement some or all of the knowledgebase 102 of FIG. 1. In the embodiment of FIG. 4, the bijective-set memory 300 includes two memories: memory 110 storing element information (also referred to as "object" information and "perception" information), and memory 112 storing set information (also referred to as "class" information, "concept" information, and "conceptual" information). Relations 301 indicate a 1 to 1 correlation between memories 110 and 112. This 1 to 1 correlation 301 indicates that the two memories 110 and 112 function like mirrors, although memory 110 is an object (element) memory and memory 112 is a class memory. Relations 302 indicate "belonging" relations, such as (−+) belongs to (−++) and (+−+). The bijective-set memory 300 is in an iterative structure, which contains elements that belong to sets. As a result, the data stored in the bijective-set memory 300 is also referred to as an iterative set. That is, the elements stored in the first level of the memory 300 are −1 and +1. These lowest-level (primitive) elements in the memory 300 are also referred to herein as "literals," "letters," or "characters." The elements stored in the second level of the memory 300 are combinations of two letters (e.g., (−+), (−−)), which are referred to herein as "words." Characters in the first level belong to specific words in the second level. The elements stored in the third level of the memory 300 are three-letter combinations, such as (−+−) and (++−), which are referred to herein as "clauses" or "triplets." Words in the second level belong to specific triplets in the third level. Elements stored at any level in the memory 300 above the third level may be represented as combinations of triplets. One of the advantages this method provides is a novel folded-graph data structure. This folded-graph data structure is able to process NP-problems as two-directional mappings instead of as a one-way function. Therefore, this method is able to solve NP-problem in polynomial time.

A second advantage is that this folded-graph data structure is able to cope with the natural logic that humans use, therefore, it is able to process natural language with the same logic and make the man-machine interaction natural.

A third advantage is its "natural order of storage". That is, all the input information is organized by its relations with triplets and sequences of the triplets. When information is retrieved, relations will be recognized in polynomial time without using an exhaustive search.

One aspect of the present invention is directed to techniques for representing three-dimensional relations. For example, according to one embodiment of the present invention a relation may be represented as a three-dimensional relation having the form of (x, y, z). Such a relation may be represented as an ordered set of three two-dimensional relations, namely: (x, y), (y, z), and (z, x). In this respect, embodiments of the present invention differ from traditional methods for representing relations, which represent relations as two-dimensional relations.

In particular, according to one embodiment of the present invention, any particular number A may be represented as a three-dimensional relation in the form of one or more ordered triplets $(x_A, y_A, z_A)$. Each such triplet may represent a distinct point in three-dimensional space. As a result, any particular number A may be represented by one or more points in three dimensional space. Each such triplet may alternatively be represented as an ordered set of three two-dimensional relations: $(x_A, y_A)$, $(y_A, z_A)$, and $(z_A, x_A)$. As this implies, another number B (which differs from the number A) may be represented by one or more triplets $(x_B, y_B, z_B)$, each of which may alternatively be represented as an ordered set of three two-dimensional relations: $(x_B, y_B)$, $(y_B, z_B)$, and $(z_B, x_B)$. More generally, any number may be represented in this manner as a three-dimensional relation.

One aspect of the present invention processes multi-dimensional relations as two inverse functions in a domain of three-dimensional nets.

Another aspect of the present invention is directed to techniques for representing numbers as binary numbers having corresponding three-dimensional relation values. For example, the x, y, and z dimensions may be mapped to the powers of 2 (i.e., 0, 1, 2, 4, 8, 16, etc.) in a repeating pattern. More specifically, an order for the x, y, and z dimensions may be selected. Such orders include the following: (1) x, y, z; (2) y, z, x; (3) z, x, y; (4) x, z, y; (5) z, y, x; and (6) y, x, z. Any of these orders may be chosen. Once such an order is chosen, the order may be repeated and the repeating sequence of dimensions may be mapped to the powers of 2. An example of such a mapping is shown below in Table 1 for the first eight powers of two. It should be appreciated, however, that such a mapping may be extended to include any number of the powers of two.

In the example of Table 1, the order x, y, z is chosen. As can be seen from Table 1, the pattern x, y, z is repeated from right to left repeatedly. In this repeating pattern, read from right to left in Table 1, x is followed by y, which is followed by z, which is followed by x, and so on.

TABLE 1

| | Bit Position | | | | | | | |
|---|---|---|---|---|---|---|---|---|
| | 8 | 7 | 6 | 5 | 4 | 3 | 2 | 1 |
| Power of 2 | 64 | 32 | 16 | 8 | 4 | 2 | 1 | 0 |
| Dimension | y | x | z | y | x | z | y | x |

Now consider any particular binary number A. Embodiments of the present invention may produce or otherwise identify a three-dimensional relation representing binary number A by mapping the bits in binary number A to dimensions using a mapping such as the one shown in Table 1, above, and then by producing a corresponding ordered set of three-dimensional relations. As an example, consider the binary number 10011010, which is overlaid on the mapping of Table 1 in Table 2, below.

TABLE 2

| | Bit Position | | | | | | | |
|---|---|---|---|---|---|---|---|---|
| | 8 | 7 | 6 | 5 | 4 | 3 | 2 | 1 |
| Power of 2 | 64 | 32 | 16 | 8 | 4 | 2 | 1 | 0 |
| Dimension | y | x | z | y | x | z | y | x |
| A | 1 | 0 | 0 | 1 | 1 | 0 | 1 | 0 |

The mapping between bits in the binary number A and the dimensions x, y, and z can be seen from Table 1. In particular, each bit in binary number A maps to the dimension that is directly above that bit in Table 2. As this example demonstrates, embodiments of the present invention may identify mappings between each bit in a binary number and one of three dimensions using a mapping such as the one shown above in Table 1. Such a mapping may be represented more concisely in the following format: 1y0x0z1y1x0z1y0x.

As will be described in more detail below, such a representation of a mapping between binary number A and the x, y, and z dimensions may be used to create a three-dimensional representation of the binary number A in a three-dimensional space. When creating such a three-dimensional representation of a binary number, for each bit in the number, a corresponding point in three-dimensional space is created. When creating a point in three-dimensional space corresponding to a particular bit, both the dimension to which that bit is mapped and the bit position of that bit are used to create the point. Therefore, to aid in the understanding of how the mapping of a binary number to dimensions is used to create a three-dimensional representation of the number, we will further refine the textual representation of the mapping by including a subscript after each dimension to represent the bit position that corresponds to the dimension. For example, we may insert such subscripts into the mapping 1y0x0z1y1x0z1y0x to create a revised mapping of $1y_80x_70z_61y_51x_40z_31y_20x_1$, in which each subscript represents the bit position of the corresponding bit.

Alternatively, embodiments of the present invention may represent numbers using a representation in which the primitive values of +1 (also written herein simply as 1) and −1 are used instead of the conventional binary values of 1 and 0. For example, the binary number A may first be mapped to an alternative representation in which each binary value of 1 remains unchanged and in which each binary value of 0 is replaced with the value of −1. For example, the binary value 10011010 may be represented alternatively as the value +1−1−1+1+1−1+1−1. This alternative representation, which is based on the primitive values of +1 and −1, is advantageous over the conventional use of the primitive values of +1 and 0, because the +1 and −1 are both equal in magnitude to each other (because they both have an absolute value or magnitude of 1) but opposite in direction to each other (because +1 has a positive direction and −1 has an opposite, negative direction). In contrast, the conventional binary values of +1 and 0 are neither equal in magnitude to each other nor opposite in direction to each other. (In fact, the value of 0 does not have a magnitude or direction.)

As will be described in more detail below, the use of +1 and −1 as primitive values enables numbers represented as combinations of +1 and −1 to be represented as three-dimensional points in a three-dimensional space more easily and directly than numbers represented as combinations of +1 and 0. This further facilitates use of such numbers to perform arithmetic (such as multiplication, division, addition, or subtraction), factorization, and other operations more easily than conventional binary numbers composed of primitive values of 0 and 1.

Because the use of +1 and −1 to represent numbers is new, there is no existing terminology to refer to a number which has permissible values consisting of the set {+1, −1}. The existing term "bit" refers to a number which has a range of permissible values consisting of the set {+1, 0}. For ease of explanation, and because embodiments of the present invention may use either a representation based on {+1, 0} or {+1, −1}, the term "bit" will be used herein to refer both to numbers that have a range of permissible values consisting of the set {+1, 0} and to numbers that have a range of permissible values consisting of the set {+1, −1}. (I think bit or "a digit" is enough for us to use at this point, unless you need a new term.) Similarly, the term "binary number" will be used herein to refer to any number consisting of bits, whether such bits have a range of {+1, 0} or {+1, −1}. For example, both the number 10011010 and the number +1−1−1+1+1−1+1−1 will be referred to herein as "binary numbers," even though the number +1−1−+1−1−1+1+1−1+1−1 does not contain "bits" in the conventional sense.

Although the number A in this particular example contains exactly eight bits, this is merely an example and does not constitute a limitation of the present invention. More generally, embodiments of the present invention may be applied to binary numbers containing any number of bits. Furthermore, embodiments of the present invention may be applied to any number that is not a binary number by first converting the number to a binary number (in which the bits have either the range {+1, 0} or {+1, −1}) and then applying the techniques disclosed herein to the binary number.

A binary number that has been mapped to three dimensions in the manner disclosed herein may be represented as a sequence of relations in a three-dimensional space. For example, referring to FIG. 5A, a three-dimensional space 500 is shown having three dimensions representing orthogonal axes in a three-dimensional space. In particular, the x dimension may represent an x axis in the three-dimensional space 500, the y dimension may represent a y axis in the three-dimensional space 500, and the z dimension may represent a z axis in the three-dimensional space 500, where the x, y, and z axes are orthogonal to each other.

Factorization is the decomposition of a number into a product of two or more other numbers, referred to as "factors." Factorizing large integers is well-known to be a difficult problem. The discovery of new methods for increasing the efficiency of factorization, therefore, would have a significant impact on the field of mathematics generally.

Figure 5A:
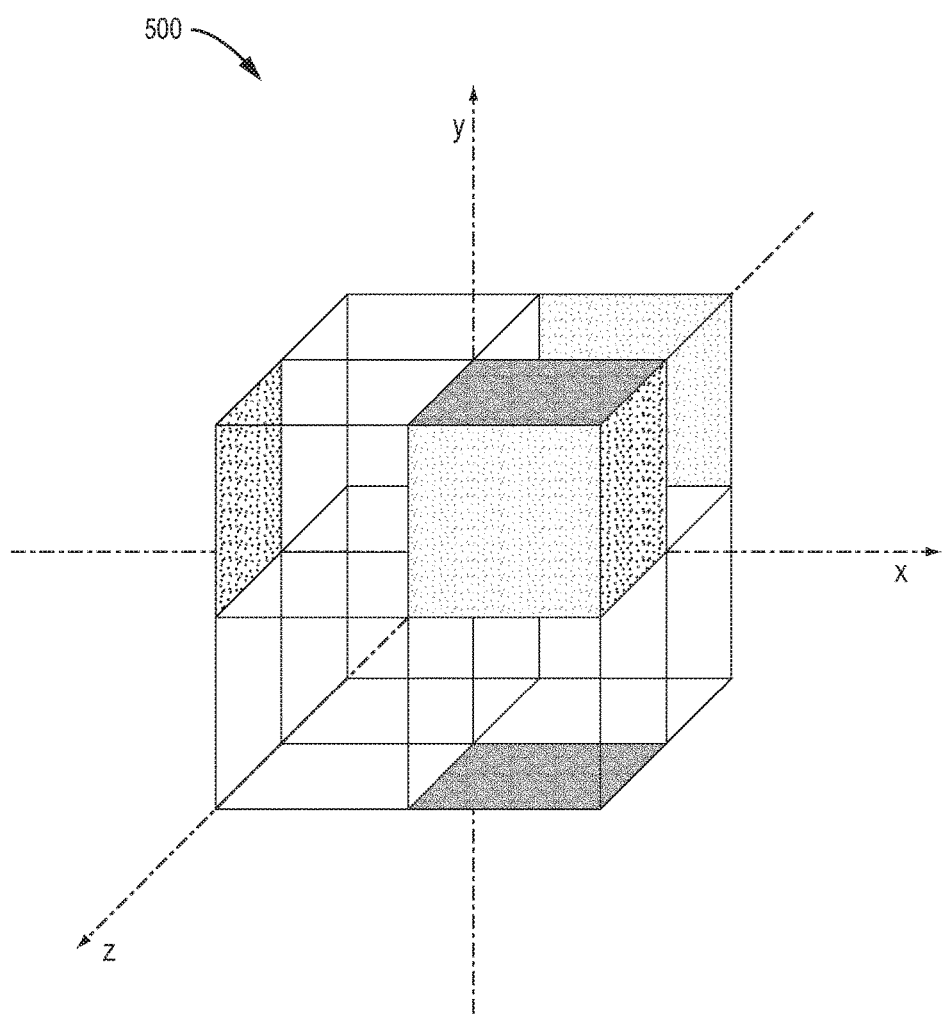
FIG. 5A illustrates a three-dimensional space which may be used to represent numbers according to embodiments of the present invention.

FIG. 5A shows a cube consisting of eight points in the three-dimensional space, namely the points (−1, −1, −−1), (−1, −1, +1), (−1, +1, −1), (−1, +1, +1), (+1, −1, −1), (+1, −1, +1), (+1, +1, −1), and (+1, +1, +1). These eight points represent the "core" layer. The shaded cube in FIG. 5A is located at coordinates (+1, +1, +1) in the three-dimensional space 500.

According to embodiments of the present invention, the three-dimensional space 500 may have a layered coordinate system, and each number may be represented as a collection of points in the three-dimensional space 500. Each number may include one or more layers within the coordinate system of the three-dimensional space 500. For any particular number, each layer corresponds to a particular bit position within the number, and each number is read from the outside layer to the inside layer. Each number is represented as a combination of bits (which, as stated above, may have a value of +1 or −1). The bits of each number are ordered within the three dimensions of the three-dimensional space 500. The values of +1 and −1 represent opposite directions in the three-dimensional space 500.

Figure 5D:
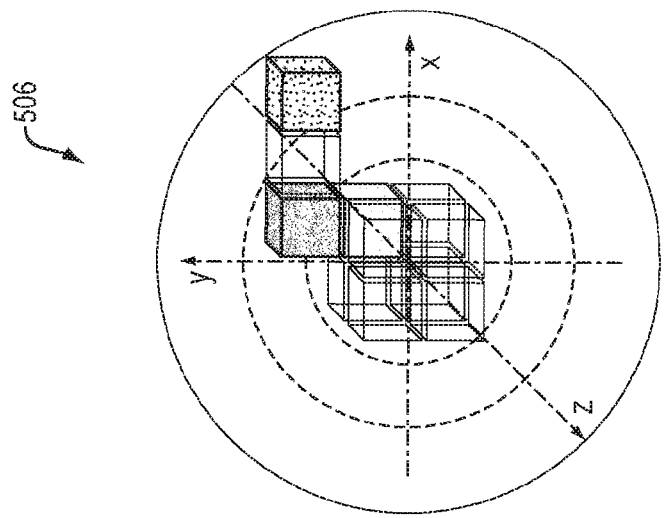
FIGS. 5B, 5C, and 5D illustrate three-dimensional representations of the numbers 1, 2, and 3 according to embodiments of the present invention.
Figure 5C:
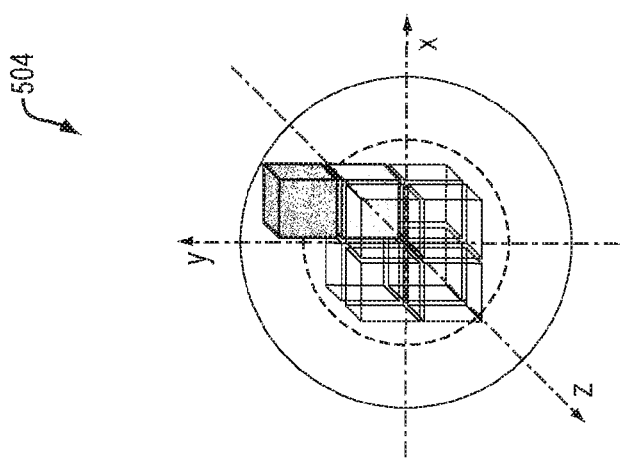
Figure 5B:
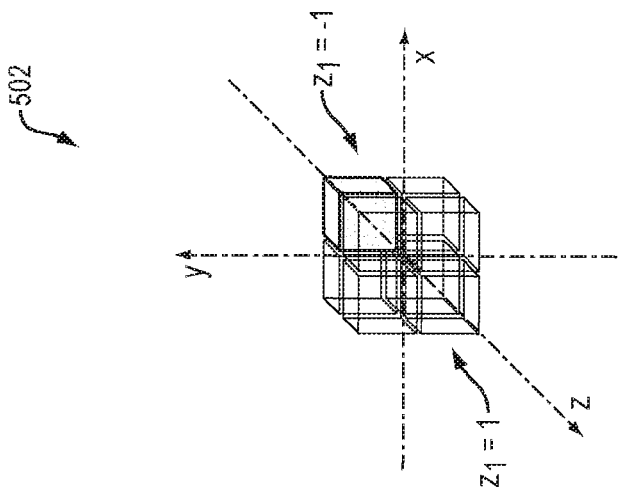
Figure 5F:
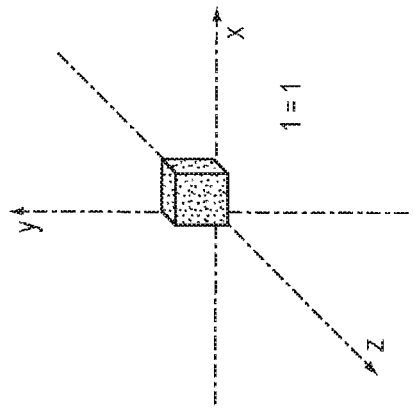
FIGS. 5E-5S illustrate three-dimensional representations of the origin point and various numbers according to embodiments of the present invention.
FIGS. 5T-5V illustrate three different but equivalent three-dimensional representations of the number 15 according to embodiments of the present invention.
FIG. 5W shows an example of a three-dimensional relation which may be used to represent the number 49 according to an embodiment of the present invention.
FIG. 5X shows an example of factoring a three-dimensional representation of the number 49 into three-dimensional representations of the numbers 7 and 7 according to an embodiment of the present invention.

FIGS. 5B, 5C, and 5D illustrate layered relations between the coordinates. To illustrate the layers, consider the decimal number six, which may be represented as the binary number +1+1−1. If we assume the three dimensions the order of z, y, x, then this number may be mapped to the three dimensions as follows: $+1x_3+1y_2-1z_1$. The first, "core" layer 502 shown in FIG. 5B contains the same set of eight three-dimensional points as shown in FIG. 5A. The first bit ($-1z_1$) is illustrated in FIG. 5B by a point having a z coordinate at z=−1. This is the first layer of the binary number +1+1−1.

FIG. 5C illustrates the second layer 504, which extends along the direction of the y axis. The second bit ($+1y_2$) in the binary number +1+1−1 is illustrated in FIG. 5C by a point having a y coordinate at y=2, namely the point in FIG. 5C at (1, 2, −1). Note that this point was not present in the first layer 502 of FIG. 1A, but was added to the first layer 502 of FIG. 5B to produce the second layer 504 of FIG. 5C. As illustrated by this example, in which the second layer 504 contains the entirety of the previous (first) layer 502 plus one or more additional points extending along the y axis, each new layer contains the entirety of the previous layer plus one or more additional points extending along the axis corresponding to the new layer.

FIG. 5D illustrates the third layer 506, which extends along the direction of the x axis. The third bit ($+1x_3$) in the binary number +1+1−1 is illustrated in FIG. 5D by a point having an x coordinate at x=3, namely the point in FIG. 5D at (3, 2, −1), which was not present in the second layer 504 of FIG. 1C, and which was added to the second layer 504 of FIG. 5C to produce the third layer 506 of FIG. 5D. (The unfilled point at (2, 2, −1) represents a coordinate relation between the point at (3, 2, −1) in the third layer and the point at (1, 2, −1) in the second layer.)

Embodiments of the present invention may be used to represent numbers according to layers such as those shown in FIGS. 5B-5D. To understand how to represent numbers according to the layers of FIGS. 5B-5D, consider FIGS. 5E-5H. First, consider the origin point at (0, 0, 0), illustrated in FIG. 5E. This point represents the number zero.

Now consider the binary number 1. To construct a three-dimensional representation of this number, assume that the order of the dimensions is x, y, z. The three-dimensional representation of the binary number 1 is constructed by reading each bit in the number and creating a point in three-dimensional space corresponding to that bit, to create a set of three-dimensional points corresponding to the number. Because the binary number 1 only contains 1 bit, the corresponding representation of the binary number 1 in three-dimensional space consists of exactly one point in three-dimensional space, namely a single point corresponding to the bit 1.

More specifically, the number to be represented in three-dimensional space is read one bit at a time, starting with the lowest bit on the right and moving toward the highest bit on the left in sequence to the next highest bit until the highest bit in the number is reached. A corresponding point in three dimensional space is created for each such bit.

Recall that the three dimensions are assigned a particular order. Assume for purposes of example that the dimensions are assigned an order of x, y, z. Therefore, the first (lowest) bit in a number is associated with the x dimension, the second (next-lowest) bit in the number is associated with the y dimension, the third (next-lowest) bit in any number is associated with the z dimension, the fourth (next-lowest) bit in any number is associated with the x dimension, and so on. In other words, the bits in the number are assigned to the x, y, and z dimensions in a repeating pattern (in whatever order has been assigned to the x, y, and z dimensions), starting with the lowest bit of the number and continuing bit-by-bit until the highest bit of the number is reached.

Each dimension is associated with a corresponding number, starting with 1, and increasing incrementally, in a repeating pattern of dimensions. For example, if the dimensions are assigned the order x, y, z, then the number 1 may be associated with the x dimension 1, the number 2 may be associated with the dimension y, the number 3 may be associated with the dimension z, the number 4 may be assigned to the dimension x, and so on. As this example illustrates, each dimension may be associated with more than one number, depending on the corresponding bit position. Each bit position may be designated with a subscript after the corresponding dimension, such as $x_1$, $y_2$, $z_3$, $x_4$, $y_5$, $z_6$, etc. The assignment of bits in a binary number may be designated by writing each bit followed by its associated dimension. For example, the binary number +1−1+1+1+1−1 may be written as $+1x_1-1y_2+1z_3+1x_4+1y_5-1z_6$.

Techniques that may be used to represent binary numbers in three-dimensional space according to embodiments of the present invention will now be described. First consider the decimal number 1, which is equal to the binary number 1. The lowest bit of this number is assigned to the first dimension in the assigned order of dimensions. In this case, the lowest bit is equal to 1, and the first dimension is the x dimension. Therefore the value of 1 is assigned to the x dimension. As described above, this may be written as $+1x_1$.

A point representing $+1x_1$ may then be created in three-dimensional space to represent the first bit of the binary number 1. A point representing $+1x_1$ (which may alternatively be written as $x_1$) may be created by starting at the origin point and moving along the axis indicated by $+1x_1$ (namely, the x axis), in the direction indicated by $+1x_1$ (namely, in the positive direction), to the coordinate on the x axis indicated by the subscript of $+1x_1$ (namely, to the coordinate x=0). This results in the creation of a point at $x_1=1$, y1 $y_1=1$, $z_1=1$. This single point represents the binary number 1. Note that coordinates of x=0, y=0, and z=0 are only used to represent the number 0, namely by the origin at (0, 0, 0). No other number is represented by a point having any coordinate equal to zero.

Now consider the decimal number 2, which is equal to the conventional binary number 10 and to the binary number +1−1 according to certain embodiments of the present invention. These two bits, starting with the lowest bit and moving bit-by-bit to the highest bit, may be assigned to the x and y dimensions, respectively. For example, the binary number +1−1 may be assigned to the x and y dimensions to produce a mapping of the binary number +1−1 to the representation $+1y_2-1x_1$.

Figure 5H:
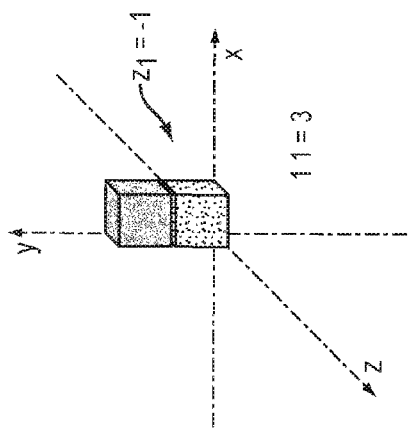
Figure 5E:
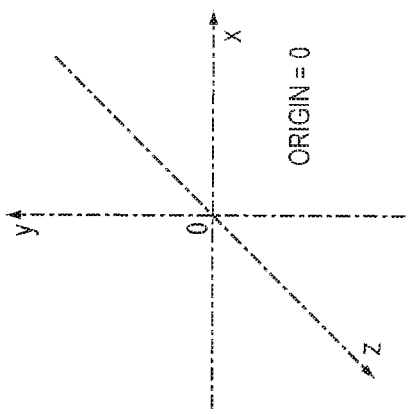
Figure 5G:
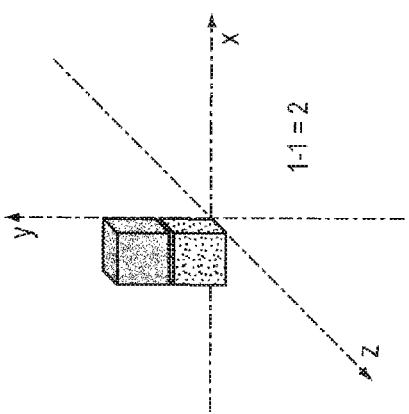
Figure 5I:
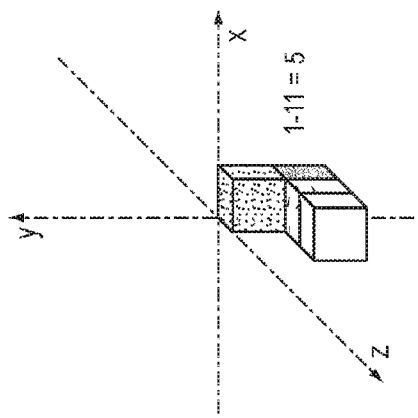
Figure 5J:
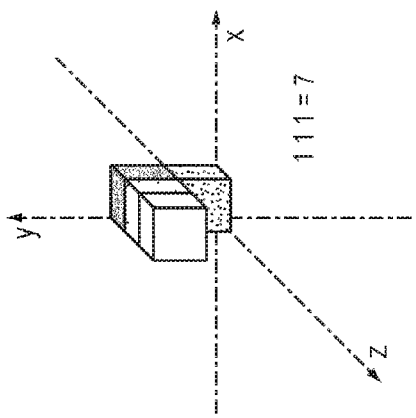
Figure 5K:
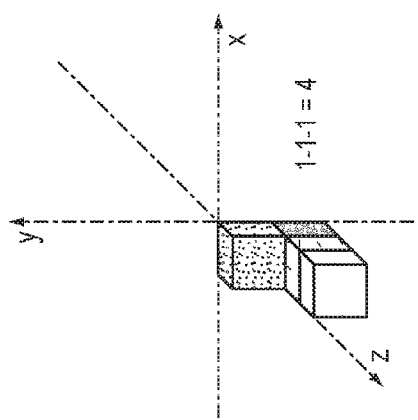
Figure 5L:
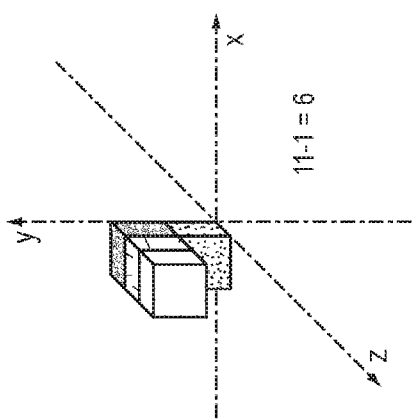
Figure 5O:
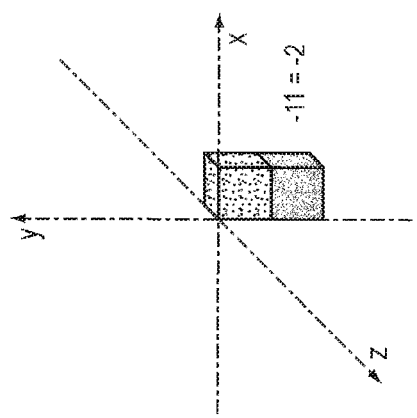
Figure 5M:
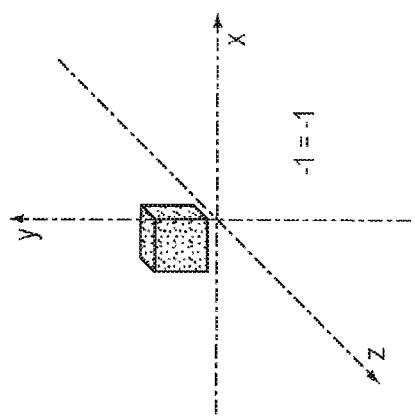
Figure 5N:
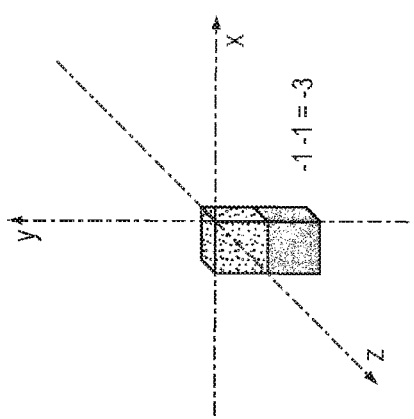
Figure 5R:
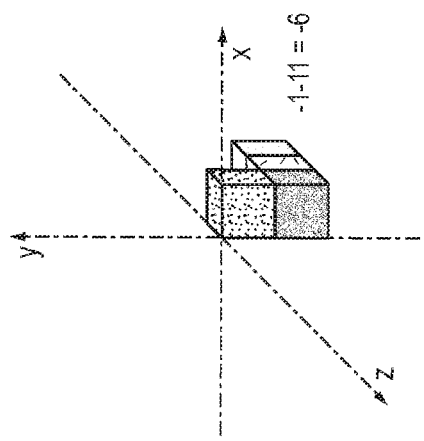
Figure 5P:
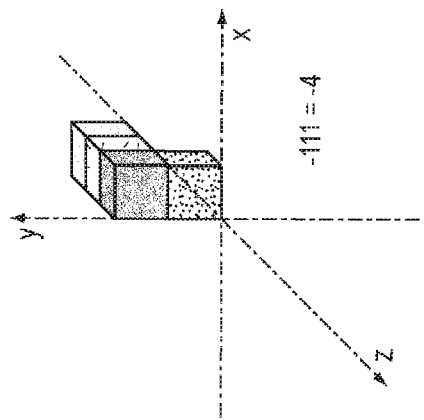
Figure 5S:
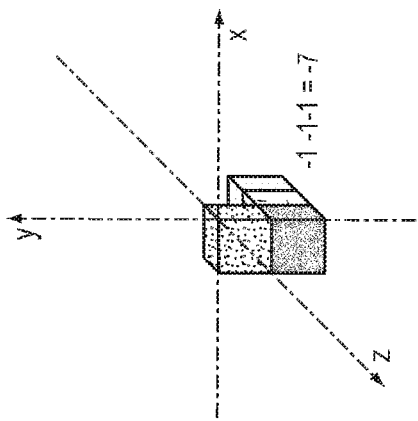
Figure 5Q:
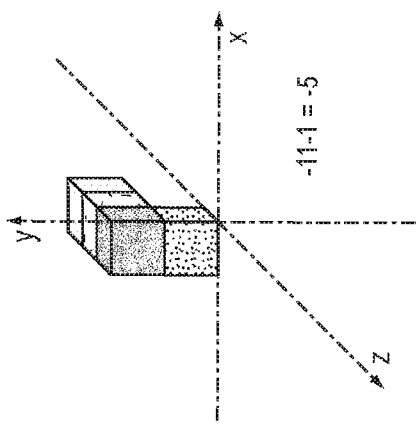

Based on this assignment of bits to dimensions, and as shown in FIG. 5G, the binary number +1−1 may be represented in three-dimensional space by a collection of points, each of which corresponds to a corresponding bit in the binary number +1−1. In particular, because the binary number +1−1 contains exactly two bits, the binary number +1−1 is represented by exactly two points in three-dimensional space in FIG. 5G. More specifically, reading from the lowest bit to the highest bit:

the lowest bit in $+1y_2-1x_1$ (i.e., the rightmost bit, having a value of $-1x_1$, is represented by a point at x=−1, y=1, z=1;

the next-lowest bit in $+1y_2-1x_1$ (i.e., the leftmost bit, having a value of $+1y_2$), is represented by a point at x=−1, y=2, z=1, as the result of moving from the previous point (x=−1, y=1, z=1) in the positive direction on the y axis to the coordinate y=2.

The resulting three-dimensional representation of decimal 2 is, as shown in FIG. 1G, a set of exactly two points at coordinates (x=−1, y=1, z=1) and (x=−1, y=2, z=1). Note that in the case of a one-bit or two-bit number, the z coordinates (or more generally, the coordinates of the third dimension in the ordered sequence of dimensions) may be chosen arbitrarily because the z (third) coordinate is not necessary to represent the number.

Now consider the decimal number 3, which is equal to the conventional binary number 11 and to the binary number +1+1 according to certain embodiments of the present invention. These two bits, starting with the lowest bit and moving bit-by-bit to the highest bit, may be assigned to the x, y, and z dimensions. As a result, the binary number +1+1 may be assigned to the x, y, and z dimensions to produce $+1y_2+1x_1$.

Based on this assignment of bits to dimensions, and as shown in FIG. 5H, the binary number +1+1 may be represented in three-dimensional space by a collection of points, each of which corresponds to a corresponding bit in the binary number +1+1. In particular, because the binary number +1+1 contains exactly two bits, the binary number +1+1 is represented by exactly two points in three-dimensional space in FIG. 5H. More specifically, reading from the lowest bit to the highest bit:

the lowest bit in $+1y_2+1x_1$ (i.e., the rightmost bit, having a value of $+1x_1$, is represented by a point at x=1, y=1, z=1;

the next-lowest bit in $+1y_2+1x_1$ (i.e., the leftmost bit, having a value of $+1y_2$), is represented by a point at x=1, y=2, z=1, as the result of moving from the previous point (x=1, y=1, z=1) in the positive direction on the y axis to the coordinate y=2.

The resulting three-dimensional representation of decimal 3 is, as shown in FIG. 1H, a set of exactly two points at coordinates (x=+1, y=1, z=1) and (x=1, y=2, z=1).

Further examples of three-dimensional representations of the decimal numbers 4, 5, 6, and 7 are shown in FIGS. 5I-5L, respectively. Those three-dimensional representations may be created in the same way as those described above. Similarly, FIGS. 5M-5S show representations of the decimal numbers −1, −2, −3, −4, −5, −6, and −7, respectively. Those three-dimensional representations may be created in the same way as those described above.

The particular examples of numbers and their representations shown herein are merely examples and do not constitute limitations of the present invention. Those having ordinary skill in the art will understand how to use the techniques disclosed herein to represent other numbers using three-dimensional relations and in three-dimensional space. Similarly, the particular examples of multiplications shown herein are merely examples and do not constitute limitations of the present invention. Those having ordinary skill in the art will understand how to use the techniques disclosed herein to perform multiplication of other numbers and to represent the results of such multiplications using three-dimensional relations and in three-dimensional space.

Figure 5V:
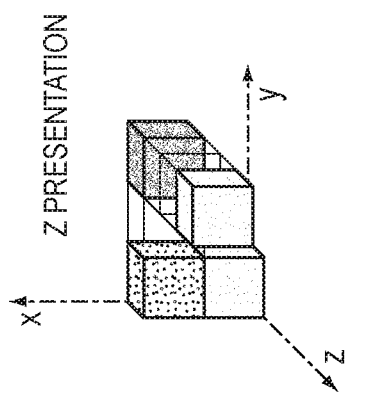

Once a particular order for the x, y, and z dimensions has been chosen to represent numbers (e.g., xyz or xzy), any particular number may be represented in any of three equivalent ways as points in three-dimensional space. For example, if the sequence xyz is chosen, then a number may be represented by mapping its bits to xyz coordinates in any of the following three sequences: xyz, yzx, or zxy. This is illustrated by the examples in FIGS. 5T, 5U, and 5V, which illustrate alternative representations of the binary number 1111 (decimal 15). FIG. 5T shows a first three-dimensional representation of the number 15 (i.e., binary 1111), in which the number 15 has been mapped to the x, y, and z dimensions in the order x, y, z. As a result, bit position 1 has been mapped to the x dimension, bit position 2 has been mapped to the y dimension, bit position 3 has been mapped to the z dimension, and bit position 4 has been mapped to the x dimension. In FIG. 5T, points corresponding to bits mapped to the x dimension are displayed in red, points corresponding to bits mapped to the y dimension are displayed in green, and points corresponding to bits mapped to the z axis are displayed in yellow. These particular colors are used merely for ease of illustration.

The three-dimensional representation 102 of the number 15 in FIG. 5T includes a red point at coordinates x=1, y=1, z=1 (representing the lowest (rightmost) bit in binary 1111), a green point at coordinates x=1, y=2, z=1 (representing the second lowest bit in binary 1111), a yellow point at coordinates x=1, y=2, z=3 (representing the next highest bit in binary 1111), and a red point at coordinates x=4, y=2, z=3, representing the highest (leftmost) bit in binary 1111.

Figure 5U:
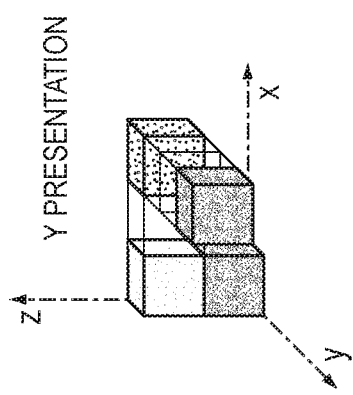
Figure 5T:
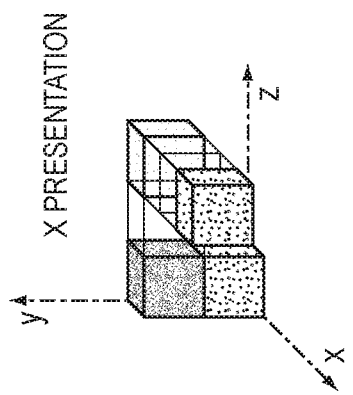

An alternative representation of the number 15 is shown in FIG. 5U, in which the dimensions have been ordered in the order y, z, x, so that the y dimension has been mapped to bit position 1, the z dimension has been mapped to bit position 2, the x dimension has been mapped to bit position 3, and the y dimension has been mapped to bit position 4. Therefore, the three-dimensional representation of the number 15 in FIG. 5U includes a green point at coordinates x=1, y=1, z=1 (representing the lowest (rightmost) bit in binary 1111), a yellow point at coordinates x=1, y=1, z=2 (representing the second lowest bit in binary 1111), a red point at coordinates x=3, y=1, z=2 (representing the next highest bit in binary 1111), and a green point at coordinates x=3, y=4, z=2, representing the highest (leftmost) bit in binary 1111.

A third representation of the number 15 is shown in FIG. 5V, in which the dimensions have been ordered in the order z, x, y, so that the z dimension has been mapped to bit position 1, the x dimension has been mapped to bit position 2, the y dimension has been mapped to bit position 3, and the z dimension has been mapped to bit position 4. Therefore, the three-dimensional representation of the number 15 in FIG. 5V includes a yellow point at coordinates x=1, y=1, z=1 (representing the lowest (rightmost) bit in binary 1111), a red point at coordinates x=2, y=1, z=1 (representing the second lowest bit in binary 1111), a green point at coordinates x=2, y=3, z=1 (representing the next highest bit in binary 1111), and a yellow point at coordinates x=2, y=3, z=4, representing the highest (leftmost) bit in binary 1111.

Figure 5W:
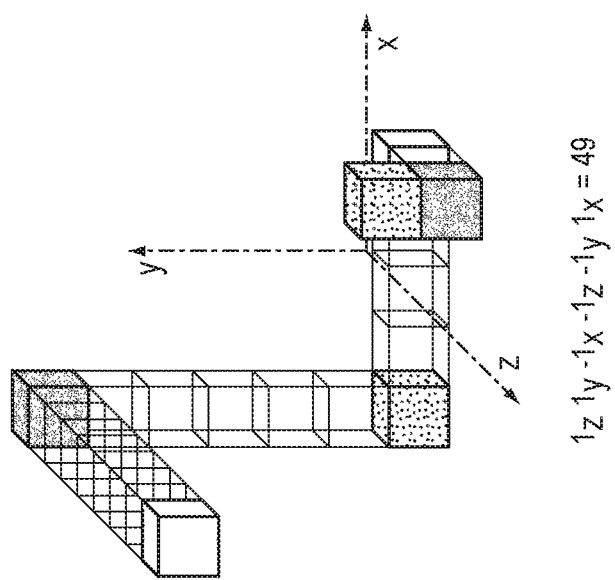

Once one or more numbers have been mapped to three dimensions and/or represented in three-dimensional space, mathematical operations (e.g., arithmetic operations, such as multiplication, division, addition, and subtraction) may be performed on one or more of such numbers to produce numbers which themselves may be mapped to three dimensions and/or represented in three-dimensional space. As merely one example, FIG. 5W shows an example of a three-dimensional representation of the decimal number forty-nine (49), which is equal to the binary number 110001 or +1+1−1−1−1+1. In the example of FIG. 5W, the order of dimensions is x, y, z. Therefore, the binary number +1+1−1−1−1+1 can be mapped to the x, y, and z dimensions as follows: $+1z_6+1y_5-1x_4-1z_3-1y_2+1x_1$. As can be seen from FIG. 5W, reading from right to left in this mapping:

the bit $+1x_1$ is represented by a point at x=1, y=1, z=1;
the bit $-1y_2$ is represented by a point at x=1, y=−2, z=1;
the bit $-1z_3$ is represented by a point at x=1, y=−2, z=−3;
the bit $-1x_4$ is represented by a point at x=−4, y=−2, z=−3;
the bit $+1y_5$ is represented by a point at x=−4, y=5, z=−3; and
the bit $+1z_6$ is represented by a point at x=−4, y=5, z=6.

The decimal number 49 may be factored into the two factors (multiplicands) decimal 7 and decimal 7. This is illustrated in FIG. 5X, which shows that the mapped binary number $+1z_6+1y_5-1x_4-1z_3-1y_2+1x_1$ (which is represented in an x presentation, in which the dimensions are ordered x, y, z) may be factored into the mapped binary number $+1x_3+1z_2+1y_1$ (which is represented in a y presentation, in which the dimensions are ordered y, z, x) and the mapped binary number $+1y_3+1x_2+1z_1$ (which is represented in a z presentation, in which the dimensions are ordered y, x, z). Techniques will be described below for both performing such factorization of a number based on the number's three-dimensional representation, and for performing the inverse of factorization, namely multiplication of two numbers based on their three-dimensional representations.

Note that when a number in one presentation is factored into two multiplicands, the two multiplicands are presented in the remaining two presentations. For example, if a number represented in the x presentation is factored into two multiplicands, then the two multiplicands are represented in the y and z presentations. As another example, if a number represented in the y presentation is factored into two multiplicands, then the two multiplicands are represented in the z and x presentations. As yet another example, if a number represented in the z presentation is factored into two multiplicands, then the two multiplicands are represented in the x and y presentations.

Another aspect of the present invention is directed to a method that processes the bits in a binary number that are equal to 0 (or −1) as complements of the binary value of 1. This aspect of the present invention is explained by the fact that, for each position in a binary number, if that position is not occupied by the value of 1 then it is occupied by the value of 0 (or −1), and if that position is not occupied by the value of 0 (or −1) then it is occupied by the value of 1.

A further aspect of the present invention is directed to a method that represents a number by two properties: (1) the sequence order of a space relation, such as the sequence order (x, y), (y, z), (z, x), or the sequence order (z, y), (y, x), (x, z); and (2) the digit relation between 0 (or −1) and 1.

Yet another aspect of the present invention is directed to a factorization method that uses the space relation and the digit relation of a product of two multiplicands to reproduce the two multiplicands. This process of factorization is the inverse process of multiplication.

In particular, this factorization method is a recursive method that replaces the highest space relation and the highest digit relation first, and lower space relations and digit relations later, step by step until finishing the process of factorization. More specifically, the recursive method begins with the highest space relation and the highest digit relation, then proceeds to the next-highest space relation and digit relation, and then to the next-highest space relation and digit relation, and so on, until all of the space relations and digit relations have been replaced to produce the factorization (i.e., multiplicands) of the product.

Embodiments of the present invention may use a reversible method to perform both multiplication and factorization (which is the inverse of multiplication) in quadratic computation time.

A "whole 1 number," denoted by $1_n$, is a binary number containing exactly and solely n 1's. For example, $1_3$=111. Similarly, a "whole 0 number," denoted by $0_n$, is a binary number containing exactly and solely n 0's. For example, $0_4$=0000. As described above, however, embodiments of the present invention may represent binary numbers using +1s and −1s. Therefore, a "whole −1 number," denoted by $-1_n$, is a binary number containing exactly and solely n−1's. For example, $-1_4$=−1−1−1−1.

Figure 7A:
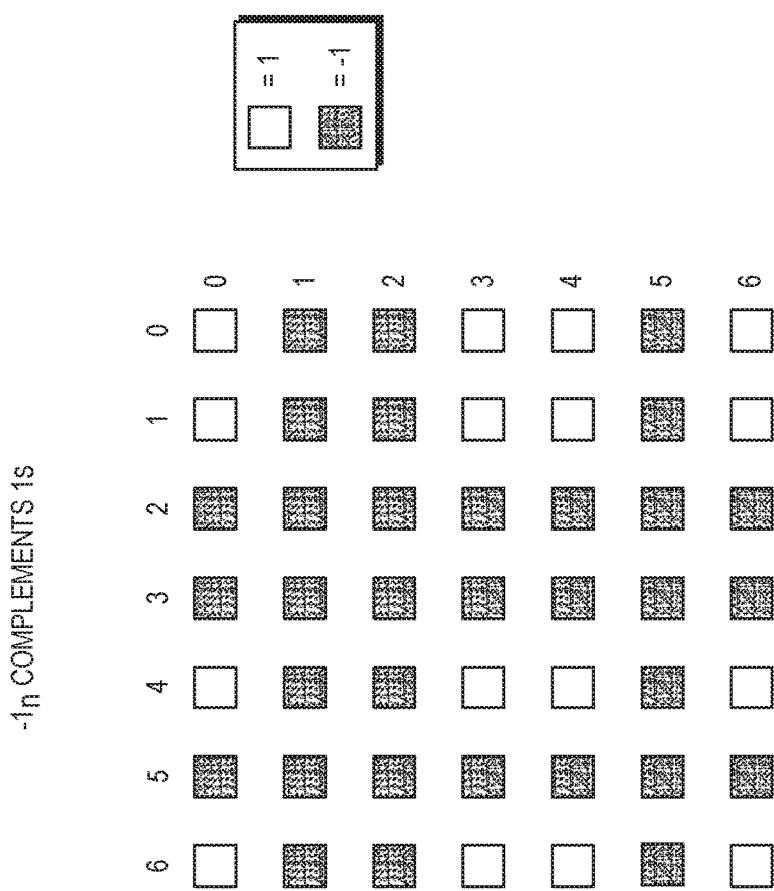
FIG. 7A is an illustration of a set of partial products of two binary numbers represented in a square form according to an embodiment of the present invention.

Referring to FIG. 7A, a set of partial products resulting from multiplying a number a (1010011) by a number b (1011001) is shown in a square form. In FIG. 7A, each 1 bit is represented by a white square, and each −1 bit is represented by a black square. In FIG. 7A, each column contains either the number b or a $-1_n$ number. The columnar $-1_n$ numbers in columns 2, 3, and 5 separate the 1s in the number a from each other. Therefore, we say that the number a is "separated by" the $-1_n$ numbers in columns 2, 3, and 5. Note that this use of the term "separated by" does not refer to arithmetic division or any other arithmetic operation, but instead to separation of 1s from each other by −1s.

Similarly, in FIG. 7A, each row contains either the number a or a $-1_n$ number. The $-1_n$ numbers in rows 1, 2, and 5 separate the is in the number b from each other. Therefore, we say that the number b is "separated by" the $-1_n$ numbers in rows 1, 2, and 5. Note that this use of the term "separated by" does not refer to arithmetic division or any other arithmetic operation, but instead to separation of 1s from each other by −1s.

We now refer to the "difference" D of the numbers a and b. The difference D is the union of the whole −1 numbers which separates number a (i.e., the whole −1 numbers in columns 2, 3, and 5) and the whole −1 numbers which separate number b (i.e., the whole −1 numbers in rows 1, 2, and 5).

As shown in FIG. 7B, the partial products of FIG. 7A may alternatively be represented in a "diagonal form." The diagonal form of the partial products is produced by rotating the square form of FIG. 7A by forty-five degrees clockwise. The resulting diagonal form shown in FIG. 7B contains thirteen columns, illustrated by vertical lines in FIG. 7B.

Figure 7C:
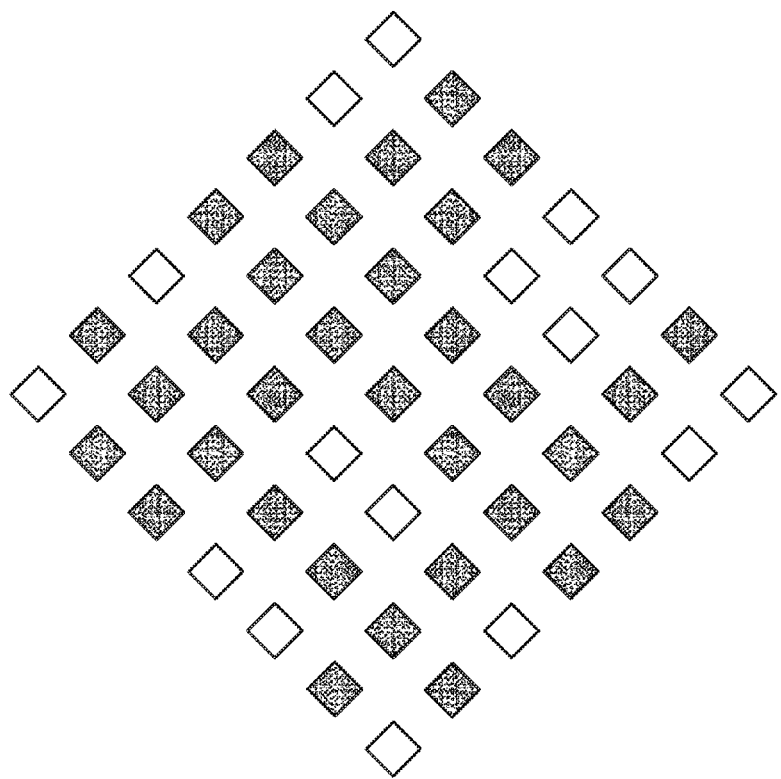
FIG. 7C is an illustration of the product resulting from summing the partial products of FIG. 7B according to an embodiment of the present invention.
Figure 8B:
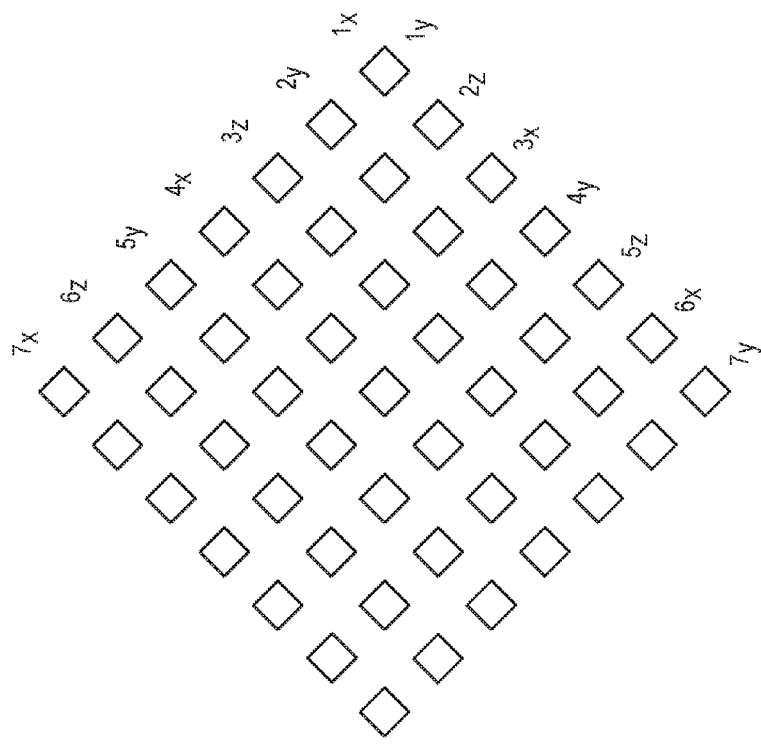
Figure 8C:
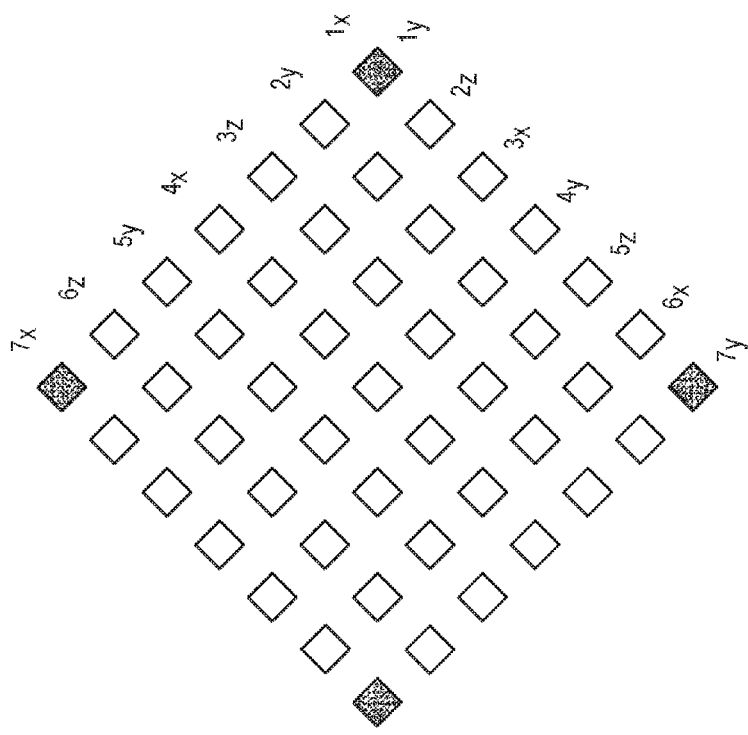
Figure 8D:
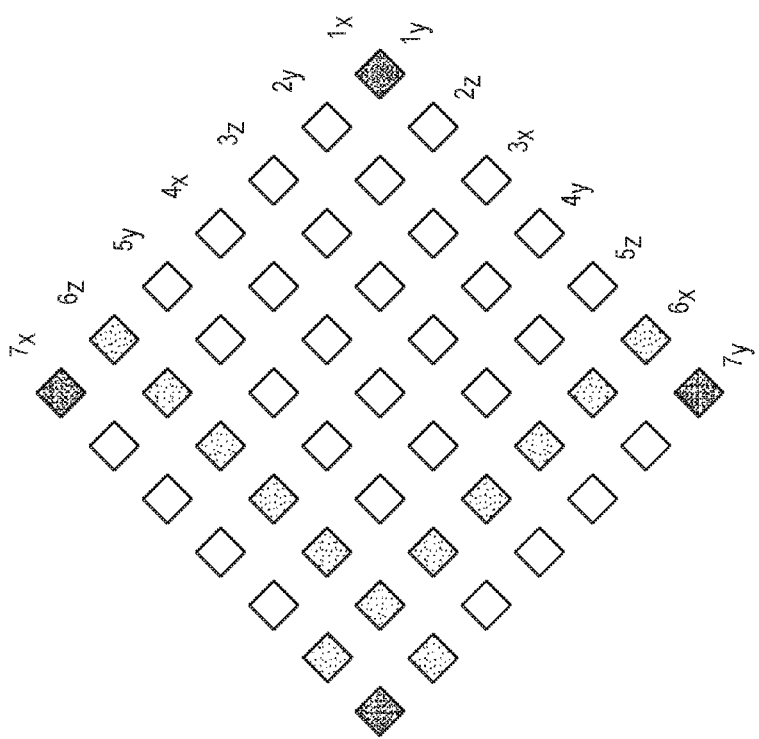
Figure 8E:
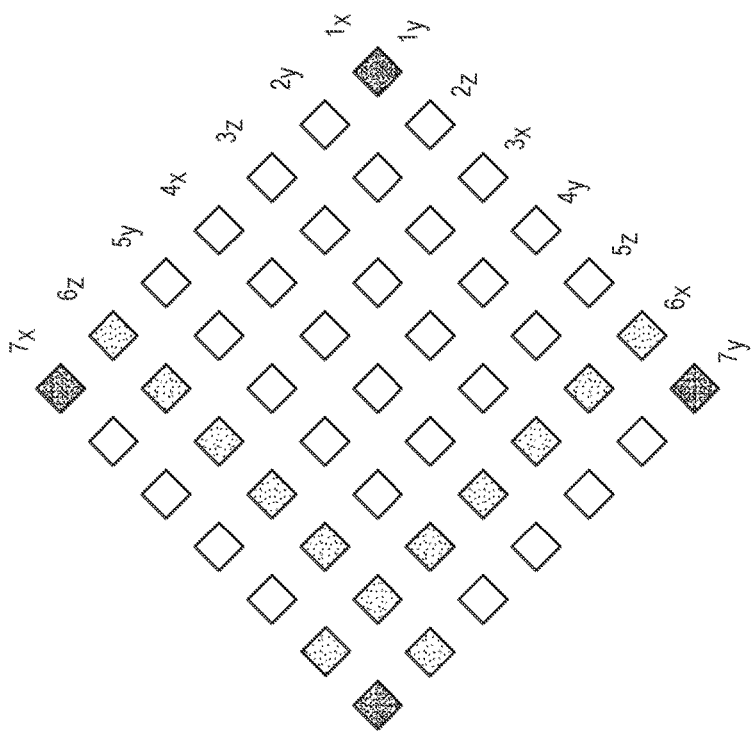
Figure 8G:
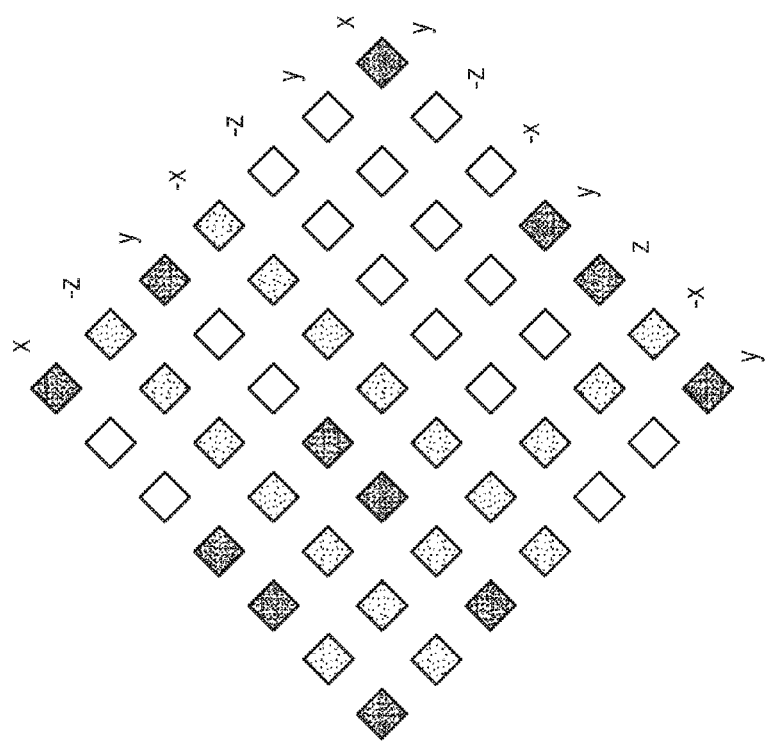

As shown in FIG. 7C, the product P of numbers a and b may be obtained by summing the bits in each of the thirteen columns (and carrying bits to the next successive column as necessary). As shown in FIG. 7C, the product P of numbers a and b is +1+1+1−1−1+1+1−1+1+1−1+1+1 (alternatively, 1110011011011).

If the product P is known, and B is the number of bits in P, then the complement C of P may be found using the following equation: $C=1_n^2-P$, where n=B/2 if B is even and where n=(B+1)/2 if B is odd. For example, if the product P=1110011011011 (as in the example of FIG. 7C), then B=13, in which case n=7 (i.e., (13+1)/2), $1_n^2$=11111100000001, and $C=1_n^2-P$=11111100000001−1110011011011=10001000100110. (What is B?)

As shown in FIG. 7D, the complement C may also be obtained by summing all of the −1s in the diagonal form of the partial products. As shown in FIG. 7D, the resulting complement +1−1−1−1+1−1−1−1+1−1+1+1−1 is the same as is obtained by the equation $C=1_n^2-P$.

Embodiments of the present invention may factor a number (product) P number as follows. To factor P, a complement C (as that term is used above) of P must first be found.

Embodiments of the present invention may find the complement C by, for example, using the equation $C=1_n^2-P$.

Once the complement C of the product P is found, the product P and the complement C may be used to factor P. An illustration of steps that may be performed to factor P is shown in FIGS. 6A-6G.

Figure 6A:
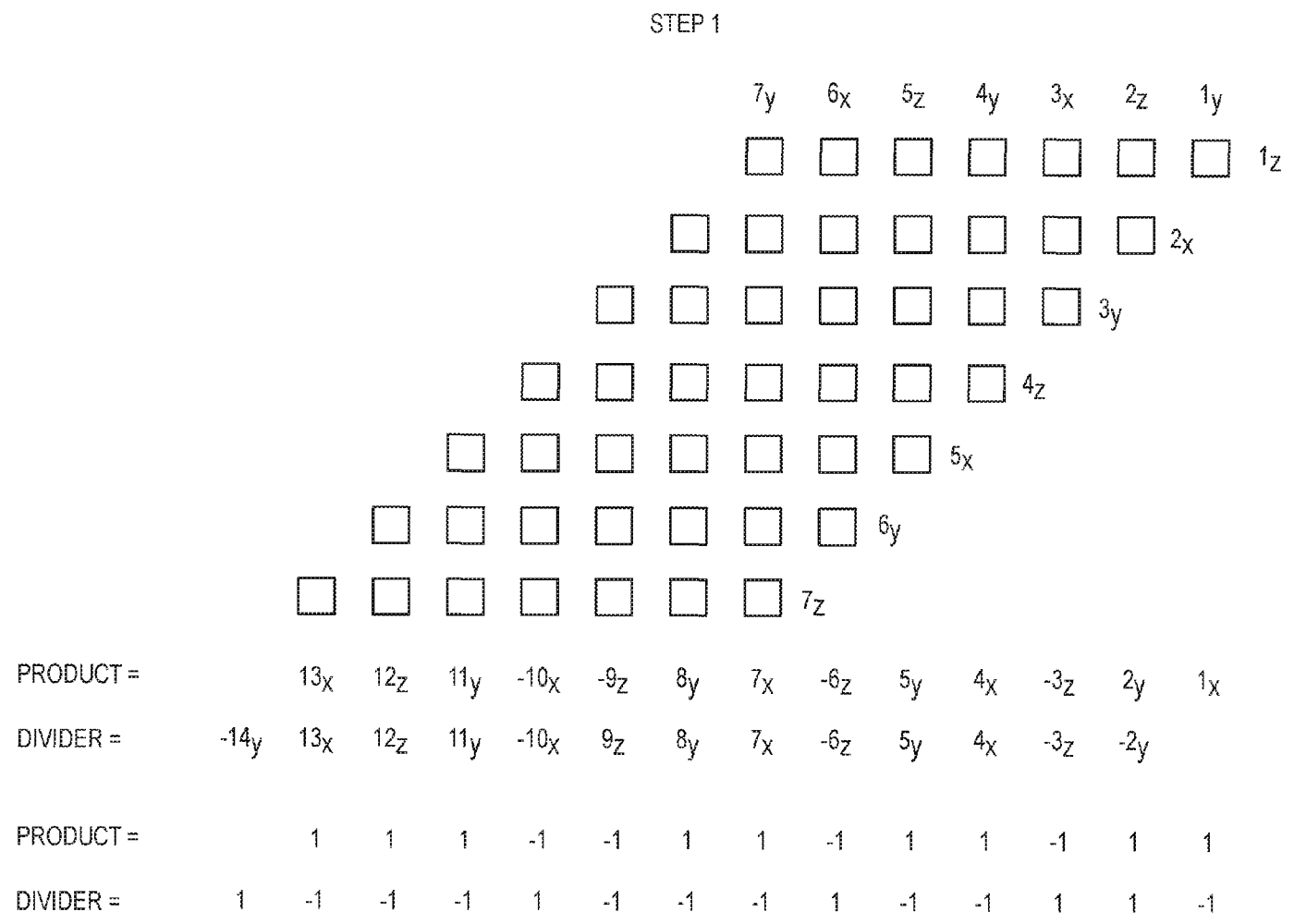

First, an order for the three dimensions x, y, and z is selected. As mentioned above, any order may be selected. Assume for purposes of example that the order (x, y, z) is selected. The bits of the product P may be assigned to the dimensions x, y, and z in the selected order, starting with the lowest-order bit of the product P. For example, as shown in FIG. 6A, the product P may be assigned to the dimensions x, y, and z in the order (x, y, z), starting with the lowest-order bit of the product P as follows: 13x12z11y−10x−9z8y7x−6z5y4x−3z2y1x (where a negative sign before a bit indicates that the value of the bit is zero, and where the absence of a negative sign before a bit indicates that the value of the bit is one).

Similarly, the bits of the complement C may be assigned to the dimensions x, y, and z in the selected order, starting with the lowest-order bit of the complement C. For example, as shown in FIG. 6A, the complement C may be assigned to the dimensions x, y, and z in the order (x, y, z), starting with the lowest-order bit of the complement C as follows: −14y13x12z11y−10x9z8y7x−6z5y4x−3z−2y1x (where a negative sign before a bit indicates that the value of the bit is one, and where the absence of a negative sign before a bit indicates that the value of the bit is zero). The bit 1x of the divider D is omitted from FIG. 2A because it is not needed to perform the factorization of the product P.

Figure 6B:
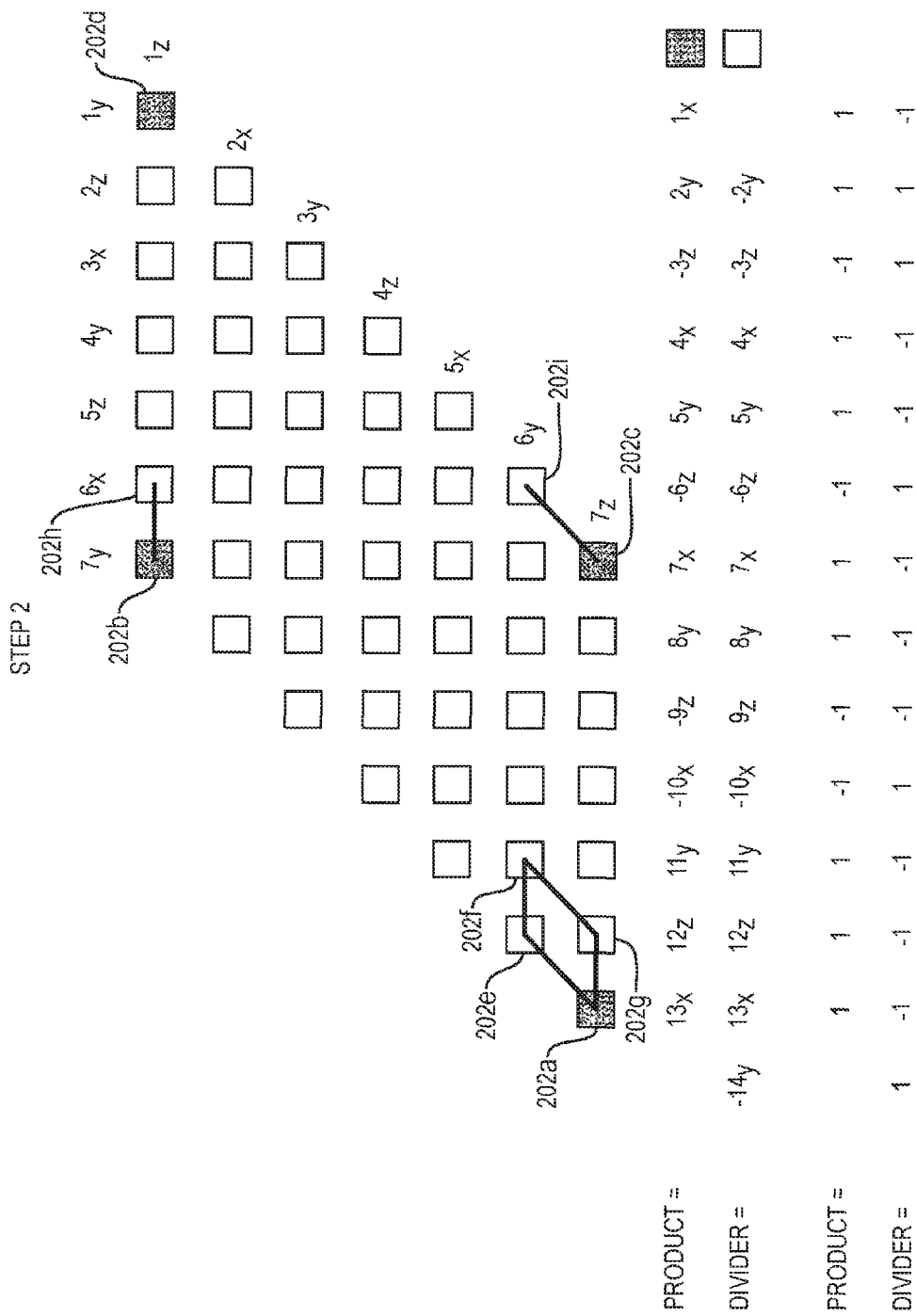

A diamond structure to hold the partial products is then constructed. Recall that B is the number of bits in the product P, and that n=B/2 if B is even and that n=(B+1)/2 if B is odd (i.e., if the highest-order bit having a value of 1 in the product P is at an odd bit position). Therefore, the number of bits in each of the multiplicands is equal to n. Therefore, a diamond structure may be constructed having n rows and n columns. An example of such a diamond structure is shown in FIG. 6A. Note that the inside of each cell (square) in this diamond structure is shown as white to indicate that the contents of these cells have not yet been assigned any values. As will be shown in FIGS. 6B-6G, cells having a value of 1 will be illustrated in black, while cells having a value of 0 will be illustrated in gray.

The rows and columns of the diamond structure may be assigned to dimensions. For example, the columns may be assigned to the dimensions x, y, and z from right to left in the previously-selected order, starting with the second dimension. For example, assuming that the selected order of the dimensions is (x, y, z), then the second dimension is y. As shown in FIG. 6A, the columns are assigned to dimensions in the order (x, y, z), starting with dimension y, as follows: 1y2z3x4y5z6x7y.

The rows may be assigned to the dimensions x, y, and z from top to bottom in the previously-selected order, starting with the third dimension. For example, assuming that the selected order of the dimensions is (x, y, z), then the third dimension is z. As shown in FIG. 6A, the rows are assigned to dimensions in the order (x, y, z), starting with dimension z, as follows: 1z2x3y4z5x6y7z.

As these examples illustrate, when the dimensions x, y, and z are assigned to bits in the product P, bits in the complement C, columns in the diamond structure, and rows in the diamond structure, when the third dimension (e.g., z) is reached, the repeating nature of the dimensions causing the next assigned dimension to be x. As a result, the three dimensions may be assigned to any number of values.

As described above, embodiments of the present invention may use a recursive method to factorize the product P. In particular, a recursive method may be used to fill the diamond structure with 1s and 0s until all cells in the diamond structure are filled with values, at which point the values in the top row of the diamond structure represent one of the multiplicands of the product P and the values in the right column of the diamond structure represent the other multiplicand of the product P. Therefore, filling the diamond structure with values factorizes the product P.

Referring to FIG. 6B, a first recursion of the recursive method begins with the leftmost bit of the product P (i.e., 1 in the example of FIG. 6B), the leftmost bit of the complement C (i.e., 1 in the example of FIG. 6B), and at the four corners of the diamond structure. The first step of the first recursion involves using the current (e.g., leftmost) bit of the product P to fill (i.e., replace) certain "1" values in the diamond structure. In particular, the first step includes copying the value of the current (i.e., leftmost) bit of the product P into the positions (i.e., four corners) of the diamond structure. As shown in FIG. 6B, because the value of the current (i.e., leftmost) bit of the product P is 1, this value is copied into the four corners of the diamond structure, as illustrated in FIG. 6B by the fact that the four corners of the diamond structure are illustrated in black.

Figure 6C:
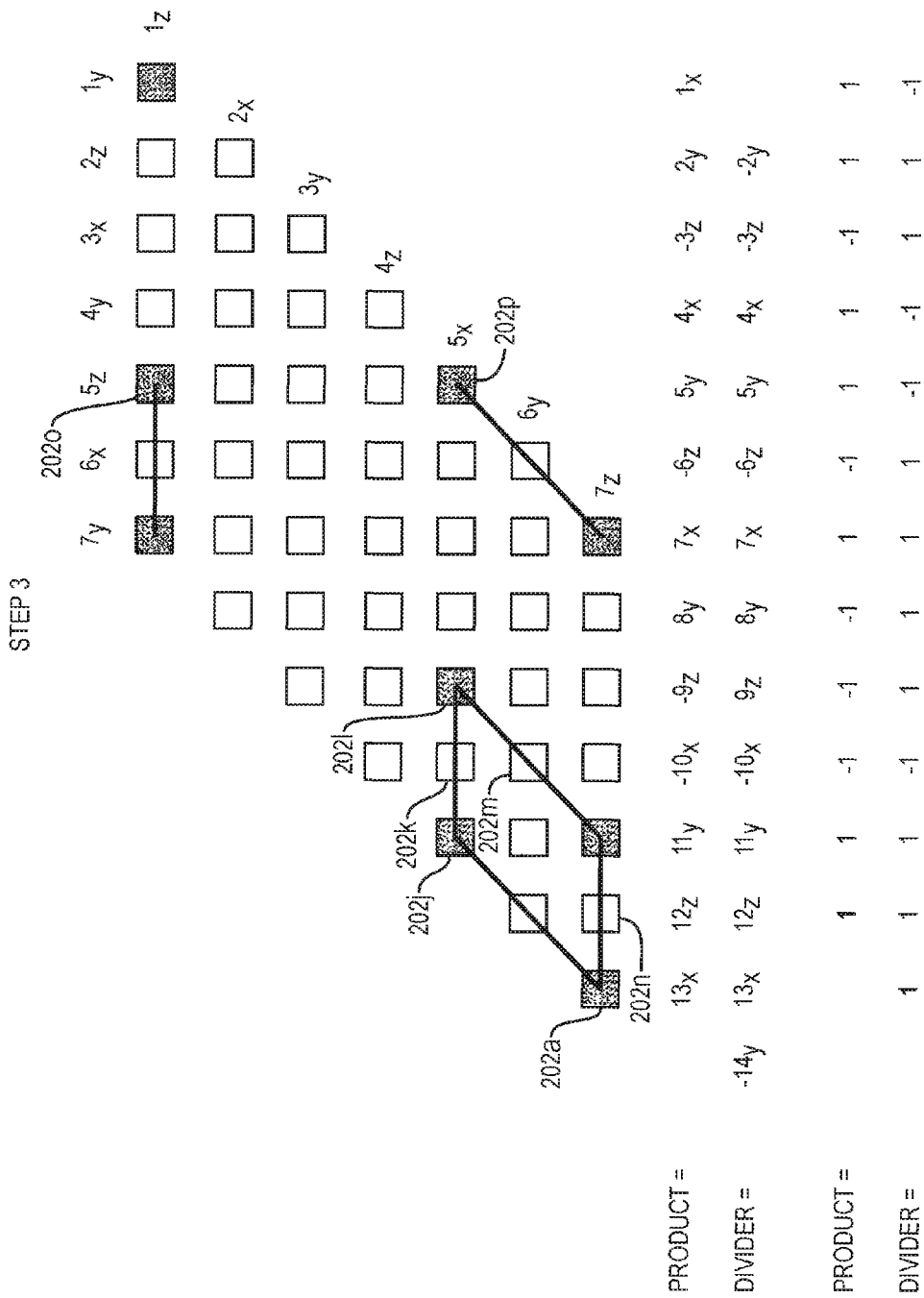

Next, the values that were just copied into the diamond structure (i.e., the is at positions $202a$, $202b$, $202c$, and $202d$ in FIG. 6B) are subtracted from the corresponding positions of product P to produce a modified product P. In the example of FIG. 6B, this consists of subtracting the 1 at position $202d$ from the 1x bit of the product, subtracting the two 1s at positions $202b$ and $202c$ from the 7x bit of the product, and subtracting the 1 at position $202a$ from the 13x bit of the product P. The resulting modified product P is shown in FIG. 6C as +1+1−1−1−1+1−1+1+1−1+1+1.

The second step of the first recursion involves using the current (e.g., leftmost) bit of the complement C to fill (i.e., replace) certain "−1" values in the diamond structure. In particular, in the second step, the current bit of the complement C is used to fill the cells of the diamond structure that are shown in FIG. 6B as being connected to positions $202a$, $202b$, and $202c$ by solid lines, namely positions $202e$, $202f$, $202g$, $202h$, and $202i$. Recall that the complement C is the sum of the 0s in the partial products of the multiplicands. As shown in FIG. 6B, the current (i.e., leftmost) bit of the complement C is 1, which represents a bit in the diamond structure. Therefore, a −1 is copied into position $202g$, as shown in FIG. 6B.

According to the "parallel rule": (1) any row in the diamond structure that contains a −1 must contain all −1s; and (2) any diagonal column (i.e., cells having the same bit position in each row) in the diagonal structure that begins with a −1 must contain all −1s.

Therefore, since positions $202e$ and $202g$ now contain a −1 due to the value from the first digit of the complement C, by parts (1) and (2) of the parallel rule position $202f$ must also contain a −1, by part (1) of the parallel rule position $202i$ must also contain a −1, and by part (2) of the parallel rule position $202h$ must also contain a −1. Therefore, as shown in FIG. 6B, the value of −1 is copied into positions $202f$, $202h$, and $202i$.

Next, the values that were just copied into the diamond structure (i.e., the 0s at positions $202e$, $202f$, $202g$, $202h$, and $202i$) are treated as is and are subtracted from the corresponding positions of complement C to produce a modified product P. In the example of FIG. 2B, this consists of subtracting the two 1s at positions $202h$ and $202i$ from the complement C, subtracting the 1 at position $202f$ from the complement C, and subtracting the two 1s at positions $202e$ and $202g$ from the complement C. The resulting modified complement C is shown in FIG. 6C as +1+1+1−1+1+1+1+1−1−1+1+1−1.

As shown in FIG. 6C: (1) the parallelogram at the lower left of the diamond structure is expanded by one position upward and one position rightward; (2) the line in the top row of the diamond structure is expanded by one position rightward; and (3) the line in the right diagonal column of the diamond structure is expanded by one position up and to the right.

The process described above is then performed again to fill the new positions shown in FIG. 6C (i.e., positions $202j$, $202k$, $202l$, $202m$, $202n$, $202o$, and $202p$), based on the new product produced above and the new complement C produced above. The results of performing this process are shown in FIG. 6C by the value of 1 filled in cell $202j$, the value of −1 filled in cell $202k$, the value of 1 filled in cell $202l$, the value of −1 filled in cell $202m$, the value of 1 filled in cell $202n$, the value of 1 filled in cell $202o$, and the value of 1 filled in cell $202p$.

Figure 6G:
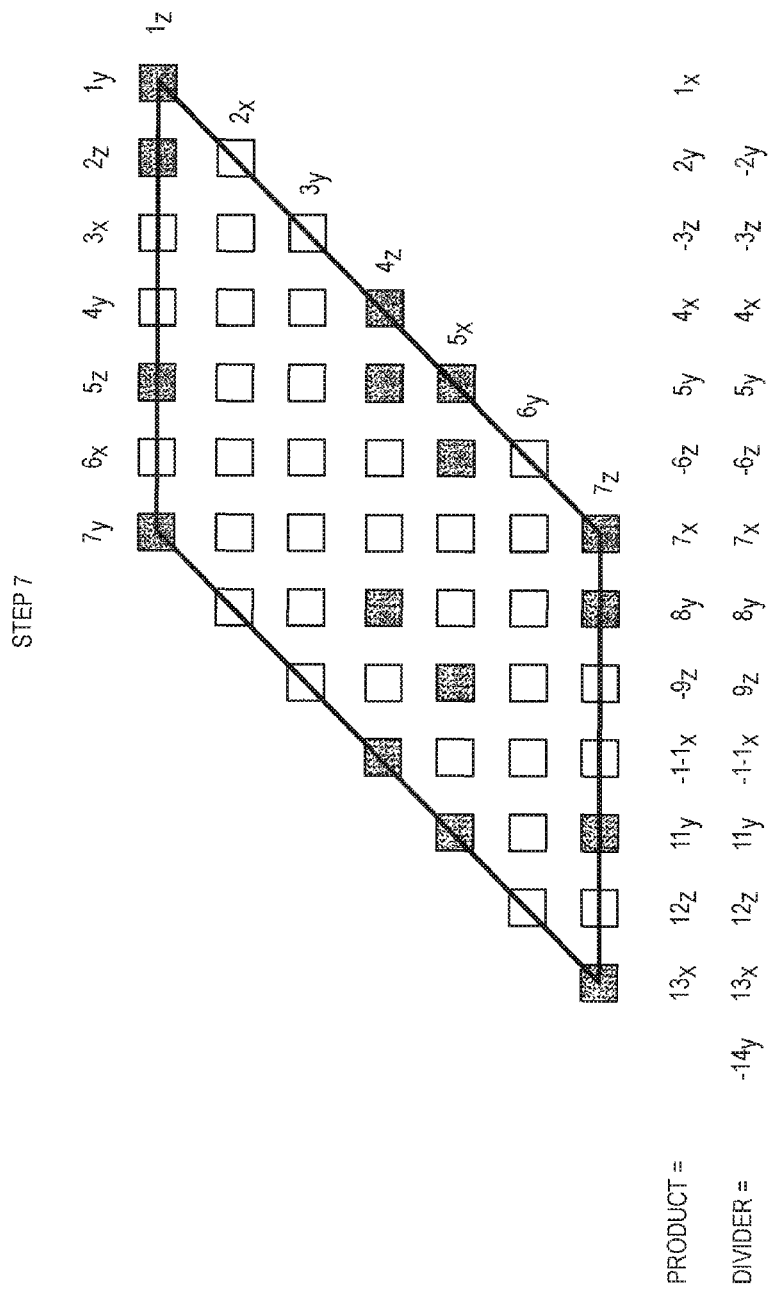

FIGS. 6D-2G show the remaining recursions of the process described above. In particular, FIG. 6G shows the result of performing all recursions of the process to fill the entire diamond structure. The contents of the diamond structure shown in FIG. 6G represent the multiplicands of the original product P. In particular the contents of the top row of the diamond structure (i.e., +1−1+1−1−1+1+1, alternatively represented as 1010011) represent the first of the two multiplicands, and the contents of the rightmost diagonal column of the diamond structure (i.e., +1−1+1+1−1−1+1, alternatively represented as 1011001) represent the second of the two multiplicands.

The same process described herein may be used to factorize any binary number of any length.

FIGS. 6A-4G illustrate another method of factorization that may be used by embodiments of the present invention. As shown in FIG. 6A, this method begins by preparing the diagonal form, without any values assigned to any elements within the diagonal form. An order for the x, y, and z dimensions is selected. The three-dimensional coordinates are prepared according to the selected order. For example, assume that the order x, y, z is selected. The bits along the top right edge and the bottom left edge of the diamond (which correspond to the first factor), therefore, are assigned to dimensions in the order x, y, z, x, y, z, and so on in a repeating pattern. The bits along the top left edge and the bottom right edge of the diamond (which correspond to the second factor) are assigned to dimensions in an order which ensures that any two vertically-aligned bits are assigned to different dimensions. As shown in FIG. 6A, this results in the bits along the top left edge and the bottom right edge of the diamond being assigned to dimensions in the order y, z, x, y, z, x, and so on in a repeating pattern. Note that this results in any two vertically aligned bits (e.g., $3_z$ and $3_x$) being assigned to different dimensions.

Finally, dimensions are assigned to each bit of the product, from right to left, in an order that differs from the orders assigned to the first and second factors. As shown in FIG. 6A, this results in the bits of the product being assigned to dimensions in the order z, x, y, z, x, y, and so on in a repeating pattern. Note that this results in any three vertically aligned bits (e.g., $3_z$, $3_x$, and $3_y$) being assigned to distinct dimensions.

In FIG. 6A and the remaining figures, each bit in the product is represented by a dimension label (x, y, or z). A dimension label with a minus sign in front of it (e.g., -y) represents a -1 at the corresponding bit position in the product. A dimension label without a minus sign in front of it (e.g., z) represents a +1 at the corresponding bit position in the product. Therefore, in FIG. 6A, the string zyx-z-yxz-yxz-yxz represents the product +1+1+1-1-1+1+1-1+1+1-1+1+1.

Then, as shown in FIG. 6B, the method factorizes the highest bit of the product. Assuming that the product is an odd number, in the first step of the method, the highest bit of the product can always be factorized to the two bits +1 and +1. These bits are placed into the corresponding bits positions representing the highest bits of the first and second factors in the diagonal pattern, namely the bits in the four corners of the diamond. This result is shown in FIG. 6C.

The method then treats the bits that have been placed into the diamond structure as representing a binary number by summing the bits that were placed into the diamond structure as a result of factoring the current bit in the product to produce a binary number. For example, by summing the four bits that were placed into the diamond structure of FIG. 6C as a result of factoring the first bit of the product along the vertical columns of the diamond structure, the sum +1-1-1-1-1+1-1-1-1-1-1+1 (or 1000010000001) is obtained. The method then subtracts this binary number from the current value of the product to obtain a remainder of the product, which is then treated as the current product. The result of this subtraction is shown as the product at the bottom of FIG. 6C.

Then the method determines whether the complement is larger (e.g., is greater than or contains more bits than) the product. If the complement contains is larger than the product, then method places a -1 from the complement into the next bit positions in the diamond structure (e.g., bit positions $6_x$ and $6_z$). Whenever the method places a -1 into the diamond structure, the method also fills the entire corresponding row/column in the diamond structure with -1s. This is illustrated by the rows/columns of -1s in the $6_x$ and $6_z$ bit positions in the diamond structure in FIG. 6D.

The method then sums the -1s that were placed into the diamond pattern to produce a binary number, and subtracts this binary number from the complement to produce a revised complement which is used in subsequent steps of the method. An example of such a revised complement is shown in FIG. 6E.

The method then iterates in the manner described above. The results of subsequent iterations are shown in FIGS. 6F-6I. Note that if, at any step, the product is larger than the complement, then the current bit positions in the diamond structure are filled with +1s, a binary number is computed from the sum of those +1s along the vertical columns of the diamond structure, and the computed binary number is subtracted from the product to obtain a revised product which is used in subsequent steps of the method.

The final result of the method, as shown in FIG. 6I, is a diamond presentation which has been completely filled with is and -1s representing the two multiplicands of the product. More specifically, the first multiplicand is represented by the bits along the top right edge of the diamond structure, and the second multiplicand is represented by the bits along the bottom right edge of the diamond structure.

Embodiments of the present invention have a variety of advantages. In general, embodiments of the present invention may be used to construct a nondeterministic Turing machine (NTM) from a deterministic Turing machine (DTM). NTMs are capable of solving computational problems with significantly greater efficiency than DTMs. One reason for this is that DTMs suffer from the "von Neumann bottleneck" because they store both the program and data in the same memory, which has a single bus for communication with the central processing unit (CPU). The limited throughput of the bus connecting the CPU and memory, and the fact that program memory and data memory cannot be accessed simultaneously because both are combined into a single memory, inherently limits the speed at which the CPU can execute programs. NTMs implemented according to embodiments of the present invention do not have the von Neumann architecture and therefore do not suffer from the von Neumann bottleneck. Instead, embodiments of the present invention may perform operations in parallel on elements of the bijective-set memory, thereby avoiding the von Neumann bottleneck.

Another benefit of embodiments of the present invention over computers having a von Neumann architecture is that computers having a von Neumann architecture require operations to be performed iteratively over data in memory using operations known as "loops." Looping is inherently limited in speed because it requires performing operations sequentially, typically one operation per datum in memory. In contrast, embodiments of the present invention may operate in parallel (i.e., simultaneously) on some or all of the elements in the bijective-set memory 102. As a result, embodiments of the present invention avoid the need for iteration and therefore may be used to perform computations much more efficiently than computers having a von Neumann architecture.

Yet another benefit of embodiments of the present invention over computers having a von Neumann architecture is that memory cells in a von Neumann architecture are addressed by numbers (e.g., 1, 2, 3, etc.). In contrast, memory cells in the bijective-set memory 102 of embodiments of the present invention are addressed by their contents. The content of a memory cell in the bijective-set memory 102, in other words, is the address of that memory cell. As a result, memory cells in the bijective-set memory 102 of the present invention may be addressed directly by their contents, and thereby addressed more quickly than von Neumann architectures, which requires contents to be found by searching through memory cells. In other words, the content of each unit of data in the bijective set memory 102 serves as its own address.

Modern computers are constructed as DTMs. Embodiments of the present invention may construct NTMs from DTMs. Embodiments of the present invention, therefore, may be used to implement NTMs using existing modern computers, and therefore may be used to enable such computers to solve computational problems with significantly greater efficiency than is possible using existing techniques, but without necessarily requiring the construction of new computer hardware.

Embodiments of the present invention may be used to perform a wide variety of computations. For example, embodiments of the present invention may be used to perform sequence alignment of the type disclosed in the above-referenced U.S. Prov. Pat. App. Ser. No. 61/798,848, entitled, "Sequence Alignment." In particular, in this embodiment:

The input 106 is the set of strings to be aligned with each other.

The output 108 is the result of the alignment (e.g., intersection, difference).

The knowledge of the relationships among the strings is learned by the learning module 114 and stored in the bijective set memory 102.

Each time the strings are compared, the NTM 100 recognizes the intersections and differences between the strings, using 3-dimensional triplets as the basic elements of comparison.

The reduction module 118 searches the strings for similarity and differences. In particular, the reduction module 118 uses reduction to retrieve the relations (x,y), (y,z), and (z,x) for each triplet (x,y,z).

The deduction module 116 identifies, for each of the input strings, one or more "class strings" in the conceptual memory 112 to which the input strings correspond.

The structure of the sequences represented by the strings is represented in the 3-dimensional spatial binary system as three-dimensional relations.

As another example, embodiments of the present invention may be applied to relational databases as follows:

The input 106 is, for each table in the database, the table (including the table name), the data from each field of the table, the records of the table, the domain (attribute), and the relation(s) of the table to other tables in the database. Each unit of data belongs to one or more records as elements of the tuples. Each unit of data also belongs to one or more domains as elements of the attributes. Each attribute belongs to one or more tables.

The learning module 114 may learn the relations within the database, and store those relations in the bijective-set memory 102.

Each time a query is performed on the database, the NTM 100 need only retrieve the intersections of the query with the data in the database. For example, consider a query for retrieving which products customers bought if they also bought computers. In response to such a query, the NTM first retrieves the names of the customers from the intersection of the customer attribute and the customer name attribute using the reduction module 118. Then, the deduction module 116 retrieves the purchase records for these customers, indicating what other products those customers bought.

In summary, embodiments of the present invention may be used to construct an implementation of a non-deterministic Turing machine (NTM). More specifically, embodiments of the present invention may construct an NTM that includes an integration of a spatial binary enumeration method, a three-dimensional relation method, a bijective-set method, and a simulated human logic method. Embodiments of the present invention may construct such methods from a conventional (deterministic) Turing machine. More specifically, embodiments of the present invention provide a programmable data structure to simulate the bijective-set using a deterministic Turing machine, and provide a logic program in a deterministic Turing machine to simulate the bijective-set operations.

Embodiments of the present invention may be used to perform factorization and/or arithmetic using the nondeterministic Turing machine of FIG. 1. For example, one embodiment of the present invention is directed to a computer, such as the computer of FIG. 1, that implements a nondeterministic Turing machine, and which includes knowledgebase 102, induction module 114, deduction module 116, reduction module 118, and cognitive logic unit 104. In this embodiment, the cognitive logic unit 104 is adapted to perform factorization and/or arithmetic using any of the techniques disclosed herein. For example, the cognitive logic module may be adapted to:

store data representing a product P in the knowledgebase 102 as a spatial binary number having a first plurality of spatial binary numbers;

create and store, in the knowledgebase 102, a mapping of the first plurality of spatial binary bits to x, y, and z dimensions in a first repeating pattern in the knowledgebase;

obtain a complement C of the product P, wherein the complementC includes a second plurality of spatial binary bits, wherein $C=1_n^2-P$; wherein B is equal to the number of bits in P; wherein $n=(B/2)$ if B is even; wherein $n=(B+1)/2$ if B is odd; wherein $1_n^z$ is a binary number of length n consisting solely of 1s;

create and store, in the knowledgebase, a mapping of the second plurality of spatial binary numbers to the x, y, and z dimensions in a second repeating pattern;

construct an empty diagonal form representation of partial products of a first and second factor of the product P, and store the empty diagonal form representation in the knowledgebase 102;

recursively fill the diagonal form representation in the knowledgebase 102 with a third plurality of spatial binary numbers based on the product P and the divider D;

identify the first and second factor of the product P based on the filled diagonal form representation; and store representations of the first and second factor of the product P as data in the knowledgebase 102.

Embodiments of the present invention have a variety of real-world benefits and applications. For example, embodiments of the present invention may be used to factorize numbers in quadratic time for use in the field of cryptography, e.g., to encrypt or decrypt data. As other examples, embodiments of the present invention may be used for weather forecasting, earthquake prediction, and generation of new computing devices. More generally, embodiments of the present invention may be used in any application for which factorization is useful, particular in applications in which highly efficient factorization is useful.

As mentioned above, one of the applications of embodiments of the present invention is cryptography. Such embodiments may be used to perform factorization on numbers having any number of bits. For example, embodiments of the present invention may be used to perform factorization on numbers having 128, 256, 512, 1024, 2048, 4096, 8192, or more bits. One benefit of embodiments of the present invention is that they may perform such factorization in quadratic time. It is particularly useful to use computers to implement embodiments of the present invention because it is entirely infeasible to attempt to factor large numbers without the assistance of computers. Even with the assistance of computers, factoring large numbers can be a difficult problem. Embodiments of the present invention may be used to facilitate factoring of large numbers.

Embodiments of the present invention include improved computers, which embody improvements to computer technology. For example, certain embodiments of the present invention are improved computers which implement nondeterministic Turing machines. Some embodiments of the present invention are improved computers which implement nondeterministic Turing machines which factor numbers using techniques disclosed herein. Some embodiments of the present invention are improved computers which implement nondeterministic Turing machines which perform arithmetic using techniques disclosed herein. These are examples of improved computers, which embody improvements to computer technology, because they are computers which perform processing more efficiently and/or effectively than computers in the prior art.

Computers implemented according to embodiments of the present invention do not merely use routine, conventional, and generic computer components. For example, the computer shown in FIG. 1 includes a variety of components, such as the cognitive logic unit 104, the learning unit 114, the deduction module 116, and the reduction module 118, which are not routine, conventional, and generic computer components. These components, when implemented both individually and in combination with each other, result in a computer which is not routine, conventional, and generic. Furthermore, methods performed by the computer are not routine, conventional, and generic because they are implemented in a computer that is not routine, conventional, and generic.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A computer implementing a nondeterministic Turing machine, the nondeterministic Turing machine comprising:
   a knowledgebase containing data representing a plurality of objects, data representing a plurality of classes, and data representing relationships between the plurality of objects and the plurality of classes;
   an induction module comprising means for generating data representing a concept represented by a plurality of inputs representing the plurality of objects and for storing the data representing the concept in the knowledgebase;
   a deduction module for retrieving, from the knowledgebase, data representing a class containing an object represented by an input to the deduction module;
   a reduction module for retrieving, from the knowledgebase, data representing an object which is a member of a class represented by an input to the reduction module;
   a cognitive logic unit adapted to:
   (1) store data representing a product P in the knowledgebase as a spatial binary number having a first plurality of spatial binary bits;
   (2) create and store a mapping of the first plurality of spatial binary bits to x, y, and z dimensions in a first repeating pattern in the knowledgebase;
   (3) obtain a complement C of the product P, wherein the complement C includes a second plurality of spatial binary bits;
   wherein $C=1_n^2-P$;
   wherein B is equal to the number of bits in P;
   wherein $n=(B/2)$ if B is even;
   wherein $n=(B+1)/2$ if B is odd;
   wherein $1_n^2$ is a binary number of length n consisting solely of 1s;
   (4) create and store a mapping of the second plurality of spatial binary bits to the x, y, and z dimensions in a second repeating pattern;
   (5) construct an empty diagonal form representation of partial products of a first and second factor of the product P;
   (6) recursively fill the diagonal form representation with a third plurality of spatial binary bits based on the product P and a divider D; and
   (7) identify the first and second factor of the product P based on the filled diagonal form representation;

wherein the data representing the plurality of objects represent the plurality of objects in the form of three-dimensional representations of a fourth plurality of spatial binary bits; and wherein the data representing the plurality of classes represent the plurality of classes in the form of three-dimensional representations of a fifth plurality of spatial binary bits;

wherein the plurality of inputs and a current state of the nondeterministic Turing machine does not determine at least one of: (1) the data representing the class, and (2) the data representing the object;

wherein each of the first, second, third, fourth, and fifth pluralities of spatial binary bits has a value selected from the set consisting of −1 and +1.

2. The computer of claim 1, wherein the cognitive logic unit comprises means for receiving an input and for triggering the induction module to perform induction on the input and on data stored in the knowledgebase to generate a representation of a class containing an object represented by the input.

3. The computer of claim 1, wherein the cognitive logic unit comprises means for receiving an input and for triggering the deduction module to perform deduction on the input and on data stored in the knowledgebase to retrieve, from the knowledgebase, data representing a class containing an object represented by the input.

4. The computer of claim 1, wherein the cognitive logic unit comprises means for receiving an input and for triggering the reduction module to perform reduction on the input and on data stored in the knowledgebase to retrieve, from the knowledgebase, data representing an object which is a member of a class represented by the input.

5. The computer of claim 1, wherein the deduction module comprises means for retrieving the data representing the class by performing a set operation on data in the knowledgebase.

6. The computer of claim 1, wherein the reduction module comprises means for retrieving the data representing the object by performing a set operation on data in the knowledgebase.

7. The computer of claim 1, wherein (7) comprises identifying the first factor based on a first edge of the diagonal form representation.

8. The computer of claim 7, wherein (7) comprises identifying the second factor based on a second edge of the diagonal form representation.

9. The computer of claim 1, wherein recursively filling the diagonal form representation in (6) includes a first step comprising copying the value of the leftmost bit of the product P into four corners of the diagonal form representation.

10. The computer of claim 9, wherein (6) includes a second step comprising subtracting the values in the four corners of the diagonal form representation from corresponding bits of the product to produce a modified product.

11. The computer of claim 9, wherein (6) includes a third step comprising copying the inverse of the leftmost bit of the complement C into bits in the diagonal form representation which are adjacent to the four corners of the diagonal form representation.

12. The computer of claim 11, wherein (6) includes a fourth step comprising applying a parallel rule to the diagonal form representation, wherein the parallel rule specifies that:

any row in the diagonal form representation that contains a zero must contain all zeroes; and any diagonal column in the diagonal form representation that begins with a zero must contain all zeroes.

13. A method for use with a computer implementing a nondeterministic Turing machine, the nondeterministic Turing machine including a knowledgebase, wherein the knowledgebase contains data representing a plurality of objects, data representing a plurality of classes, and data representing relationships between the plurality of objects and the plurality of classes, wherein the method comprises:

(1) generating data representing a concept represented by a plurality of inputs representing the plurality of objects and for storing the data representing the concept in the knowledgebase;

(2) retrieving, from the knowledgebase, data representing a class containing an object represented by an input to a deduction module;

(3) retrieving, from the knowledgebase, data representing an object which is a member of a class represented by an input to a reduction module;

(4) storing data representing a product P in the knowledgebase as a spatial binary number having a first plurality of spatial binary bits;

(5) creating and storing a mapping of the first plurality of spatial binary bits to x, y, and z dimensions in a first repeating pattern in the knowledgebase;

(6) obtaining a complement C of the product P, wherein the complement C includes a second plurality of spatial binary bits;

wherein $C = 1_n^2 - P$;

wherein B is equal to the number of bits in P;

wherein n=(B/2) if B is even;

wherein n=(B+1)/2 if B is odd;

wherein $1_n^2$ is a binary number of length n consisting solely of 1s;

(7) creating and storing a mapping of the second plurality of spatial binary bits to the x, y, and z dimensions in a second repeating pattern;

(8) constructing an empty diagonal form representation of partial products of a first and second factor of the product P;

(9) recursively filling the diagonal form representation with a third plurality of spatial binary bits based on the product P and a divider D; and

(10) identifying the first and second factor of the product P based on the filled diagonal form representation;

wherein the data representing the plurality of objects represent the plurality of objects in the form of three-dimensional representations of a third plurality of spatial binary bits; and wherein the data representing the plurality of classes represent the plurality of classes in the form of three-dimensional representations of a fourth plurality of spatial binary bits;

wherein the plurality of inputs and a current state of the nondeterministic Turing machine does not determine at least one of: (1) the data representing the class, and (2) the data representing the object;

wherein each of the third and fourth pluralities of spatial binary bits has a value selected from the set consisting of −1 and +1.

14. The method of claim 13, wherein (10) comprises identifying the first factor based on a first edge of the diagonal form representation.

15. The method of claim 14, wherein (10) comprises identifying the second factor based on a second edge of the diagonal form representation.

16. The method of claim 13, wherein recursively filling the diagonal form representation in (9) includes a first step comprising copying the value of the leftmost bit of the product P into four corners of the diagonal form representation.

17. The method of claim 16, wherein (9) includes a second step comprising subtracting the values in the four corners of the diagonal form representation from corresponding bits of the product to produce a modified product.

18. The method of claim 17, wherein (9) includes a third step comprising copying the inverse of the leftmost bit of the complement C into bits in the diagonal form representation which are adjacent to the four corners of the diagonal form representation.

19. The method of claim 18, wherein (9) includes a fourth step comprising applying a parallel rule to the diagonal form representation, wherein the parallel rule specifies that:
- any row in the diagonal form representation that contains a zero must contain all zeroes; and
- any diagonal column in the diagonal form representation that begins with a zero must contain all zeroes.

\* \* \* \* \*

UNITED STATES PATENT AND TRADEMARK OFFICE
CERTIFICATE OF CORRECTION

PATENT NO. : 9,740,983 B2  
APPLICATION NO. : 15/278856  
DATED : August 22, 2017  
INVENTOR(S) : Sherwin Han Page 1 of 1

It is certified that error appears in the above-identified patent and that said Letters Patent is hereby corrected as shown below:

In the Specification

In Column 20, Line 2, delete "-1$x_1$," and insert -- -1$x_1$), --, therefor.

In Column 20, Line 35, delete "+1$x_1$," and insert -- +1$x_1$), --, therefor.

In Column 23, Line 28, delete "is" and insert -- 1s --, therefor.

In Column 25, Line 29, delete "is" and insert -- 1s --, therefor.

In Column 25, Line 66, delete "is" and insert -- 1s --, therefor.

In Column 27, Line 59, delete "is" and insert -- 1s --, therefor.

In Column 30, Line 12, delete "$1_n{}^z$" and insert -- $1_n{}^2$ --, therefor.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*